United States Patent
Bradley et al.

(10) Patent No.: US 11,760,280 B2
(45) Date of Patent: Sep. 19, 2023

(54) SYSTEMS AND METHODS FOR STREAMING PROCESSING FOR AUTONOMOUS VEHICLES

(71) Applicant: UATC, LLC

(72) Inventors: David McAllister Bradley, Pittsburgh, PA (US); Galen Clark Haynes, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 862 days.

(21) Appl. No.: 15/983,491

(22) Filed: May 18, 2018

(65) Prior Publication Data

US 2019/0220013 A1 Jul. 18, 2019

Related U.S. Application Data

(60) Provisional application No. 62/616,542, filed on Jan. 12, 2018.

(51) Int. Cl.
*B60R 16/023* (2006.01)
*G01S 13/72* (2006.01)
(Continued)

(52) U.S. Cl.
CPC ............. *B60R 16/023* (2013.01); *B60N 2/00* (2013.01); *G01S 13/723* (2013.01);
(Continued)

(58) Field of Classification Search
CPC ....... B60R 16/023; B60N 2/00; G01S 13/723; G01S 13/931; G01S 17/66; G01S 17/86;
(Continued)

(56) References Cited

U.S. PATENT DOCUMENTS 6,256,712 B1 7/2001 Challenger et al.
8,791,802 B2 7/2014 Schwindt et al.
(Continued)

FOREIGN PATENT DOCUMENTS

EP 2919032 9/2015
JP 2017211817 11/2017

OTHER PUBLICATIONS

Halsey, A glimpse inside the secret site where driverless cars undergo 20,000 tests, https://www.washingtonpost.com/local/trafficandcommuting/a-glimpse-inside-the-secret-site-where-driverless-cars-undergo-20000-tests/2017/11/04/874e083c-bf15-11e7-97d9-bdab5a0ab381_story.html (Year: 2017).*

(Continued)

*Primary Examiner* — Aryan E Weisenfeld
(74) *Attorney, Agent, or Firm* — Dority & Manning, P.A.

(57) ABSTRACT

Generally, the present disclosure is directed to systems and methods for streaming processing within one or more systems of an autonomy computing system. When an update for a particular object or region of interest is received by a given system, the system can control transmission of data associated with the update as well as a determination of other aspects by the given system. For example, the system can determine based on a received update for a particular aspect and a priority classification and/or interaction classification determined for that aspect whether data associated with the update should be transmitted to a subsequent system before waiting for other updates to arrive.

20 Claims, 9 Drawing Sheets

(51) Int. Cl.
| | |
|---|---|
| *G01S 13/931* | (2020.01) |
| *G01S 17/66* | (2006.01) |
| *G01S 17/86* | (2020.01) |
| *G01S 17/931* | (2020.01) |
| *B60N 2/00* | (2006.01) |
| *G01S 17/933* | (2020.01) |
| *G06V 20/58* | (2022.01) |
| *G06N 20/00* | (2019.01) |
| *G05D 1/00* | (2006.01) |
| *G05D 1/02* | (2020.01) |
| *G06N 5/04* | (2023.01) |
| *G01S 13/86* | (2006.01) |

(52) U.S. Cl.
CPC ............ *G01S 13/931* (2013.01); *G01S 17/66* (2013.01); *G01S 17/86* (2020.01); *G01S 17/931* (2020.01); *G01S 17/933* (2013.01); *G05D 1/0088* (2013.01); *G05D 1/0212* (2013.01); *G05D 1/0238* (2013.01); *G06N 5/04* (2013.01); *G06N 20/00* (2019.01); *G06V 20/58* (2022.01); *G01S 13/865* (2013.01); *G01S 13/867* (2013.01); *G01S 2013/9318* (2020.01); *G01S 2013/9319* (2020.01); *G01S 2013/9323* (2020.01); *G01S 2013/93185* (2020.01); *G01S 2013/93273* (2020.01); *G05D 1/0257* (2013.01); *G05D 2201/0213* (2013.01)

(58) Field of Classification Search
CPC .... G01S 17/931; G01S 17/933; G01S 13/865; G01S 13/867; G01S 2013/9318; G01S 2013/93185; G01S 2013/9319; G01S 2013/9323; G01S 2013/93273; G05D 1/0088; G05D 1/0212; G05D 1/0238; G05D 1/0257; G05D 2201/0213; G06K 9/00805; G06K 9/00791; G06K 9/00624; G06N 5/04; G06N 20/00; G06N 5/00; G07C 5/008

See application file for complete search history.

(56) References Cited

U.S. PATENT DOCUMENTS

| | | | |
|---|---|---|---|
| 10,216,189 | B1 | 2/2019 | Haynes |
| 10,345,815 | B2 | 7/2019 | Lv et al. |
| 10,543,838 | B2 | 1/2020 | Kentley-Klay et al. |
| 10,950,129 | B1 | 3/2021 | Kourous-Hanigan et al. |
| 2012/0083960 | A1 | 4/2012 | Zhu et al. |
| 2014/0136414 | A1 | 5/2014 | Abhyanker |
| 2014/0203959 | A1 | 7/2014 | Kriel et al. |
| 2015/0268058 | A1 | 9/2015 | Samarasekera et al. |
| 2016/0012282 | A1 | 1/2016 | Shima et al. |
| 2017/0060893 | A1 | 3/2017 | Taveniku et al. |
| 2017/0101092 | A1 | 4/2017 | Nguyen Van et al. |
| 2017/0120902 | A1 | 5/2017 | Kentley et al. |
| 2017/0262727 | A1 | 9/2017 | Kozuka et al. |
| 2018/0012088 | A1 | 1/2018 | Matsuo et al. |
| 2018/0261020 | A1 | 9/2018 | Petousis et al. |
| 2018/0341822 | A1 | 11/2018 | Hovis et al. |
| 2019/0065895 | A1 | 2/2019 | Wang et al. |
| 2019/0086549 | A1 | 3/2019 | Ushani et al. |
| 2019/0236955 | A1* | 8/2019 | Hu ................... G08G 1/096844 |
| 2019/0253694 | A1* | 8/2019 | Matsuo ................... G06F 12/00 |
| 2019/0384302 | A1 | 12/2019 | Silva et al. |
| 2020/0180638 | A1 | 6/2020 | Kanoh |
| 2020/0410787 | A1* | 12/2020 | Petousis ............... G07C 5/0841 |
| 2021/0027629 | A1 | 1/2021 | Tao et al. |
| 2021/0094173 | A1 | 4/2021 | Cristache |

OTHER PUBLICATIONS

Partial Search Report for PCT/US2019/013168, dated May 2, 2019, 13 pages.

International Search Report and Written Opinion for PCT/US2019/013168, dated Jul. 2, 2019, 22 pages.

U.S. Appl. No. 15/983,504, filed May 18, 2018, 72 pages.

U.S. Appl. No. 17/515,932, filed Nov. 1, 2021, 73 pages.

* cited by examiner

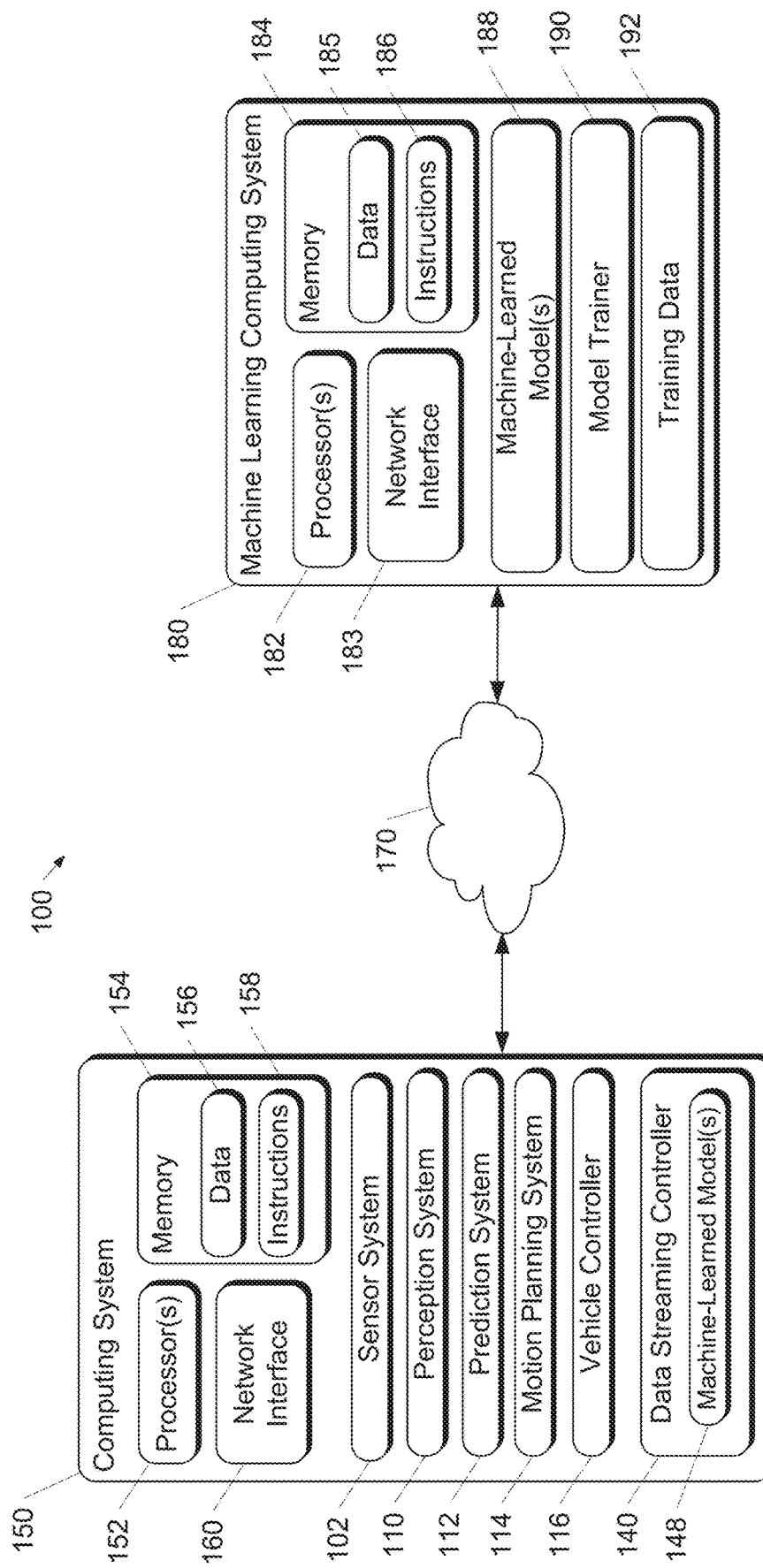

SYSTEMS AND METHODS FOR STREAMING PROCESSING FOR AUTONOMOUS VEHICLES

PRIORITY CLAIM

The present application is based on and claims the benefit of U.S. Provisional Patent Application No. 62/616,542, having a filing date of Jan. 12, 2018, which is incorporated by reference herein.

FIELD

The present disclosure relates generally to autonomous vehicles. More particularly, the present disclosure relates to systems and methods for streaming processing within one or more systems of an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system including a sensor system, a memory device, and a data streaming controller. The sensor system includes at least one sensor configured to obtain sensor data at a plurality of consecutive cycles, the sensor data at each cycle including information descriptive of a 360 degree scene of an environment surrounding an autonomous vehicle. The memory device is configured to store the sensor data as the sensor data becomes available from the at least one sensor. The data streaming controller includes one or more processors and one or more non-transitory computer-readable media that collectively store instructions that, when executed by the one or more processors, cause the data streaming controller to perform operations. The operations include determining a subset of the sensor data at each cycle. The operations also include initiating transfer of the subset of the sensor data at each cycle from the memory device to an autonomy system associated with the computing system.

Another example aspect of the present disclosure is directed to a computer-implemented method. The method includes obtaining, by a computing system comprising one or more computing devices, sensor data at a plurality of consecutive cycles, the sensor data at each cycle including information descriptive of a 360 degree scene of an environment surrounding an autonomous vehicle. The method also includes storing, by the computing system, the sensor data in a memory device as the sensor data becomes available from the at least one sensor. The method also includes determining, by the computing system, a subset of the sensor data at each cycle. The method also includes initiating transfer, by the computing system, of the subset of the sensor data at each cycle from the memory device to an autonomy system associated with the computing system in response to the entire subset being stored in the memory device.

Another example aspect of the present disclosure is directed to an autonomous vehicle. The autonomous vehicle includes one or more processors and one or more non-transitory computer-readable media that collectively store instructions that, when executed by the one or more processors, cause the one or more processors to perform operations. The operations include obtaining sensor data at a plurality of consecutive cycles, the sensor data at each cycle including information descriptive of a 360 degree scene of an environment surrounding an autonomous vehicle. The operations also include storing the sensor data in a memory device as the sensor data becomes available from the at least one sensor. The operations also include determining a portion of the sensor data at each cycle corresponding to at least one object of interest. The operations also include transferring the portion of the sensor data at each cycle from the memory device to an autonomy system associated with the computing system in response to the entire portion being stored in the memory device. The operations also include generating updated state data associated with the at least one object of interest based at least in part on the portion of sensor data received by the autonomy system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts a block diagram of an example computing system according to example aspects of the present disclosure;

DETAILED DESCRIPTION

Figure 1:
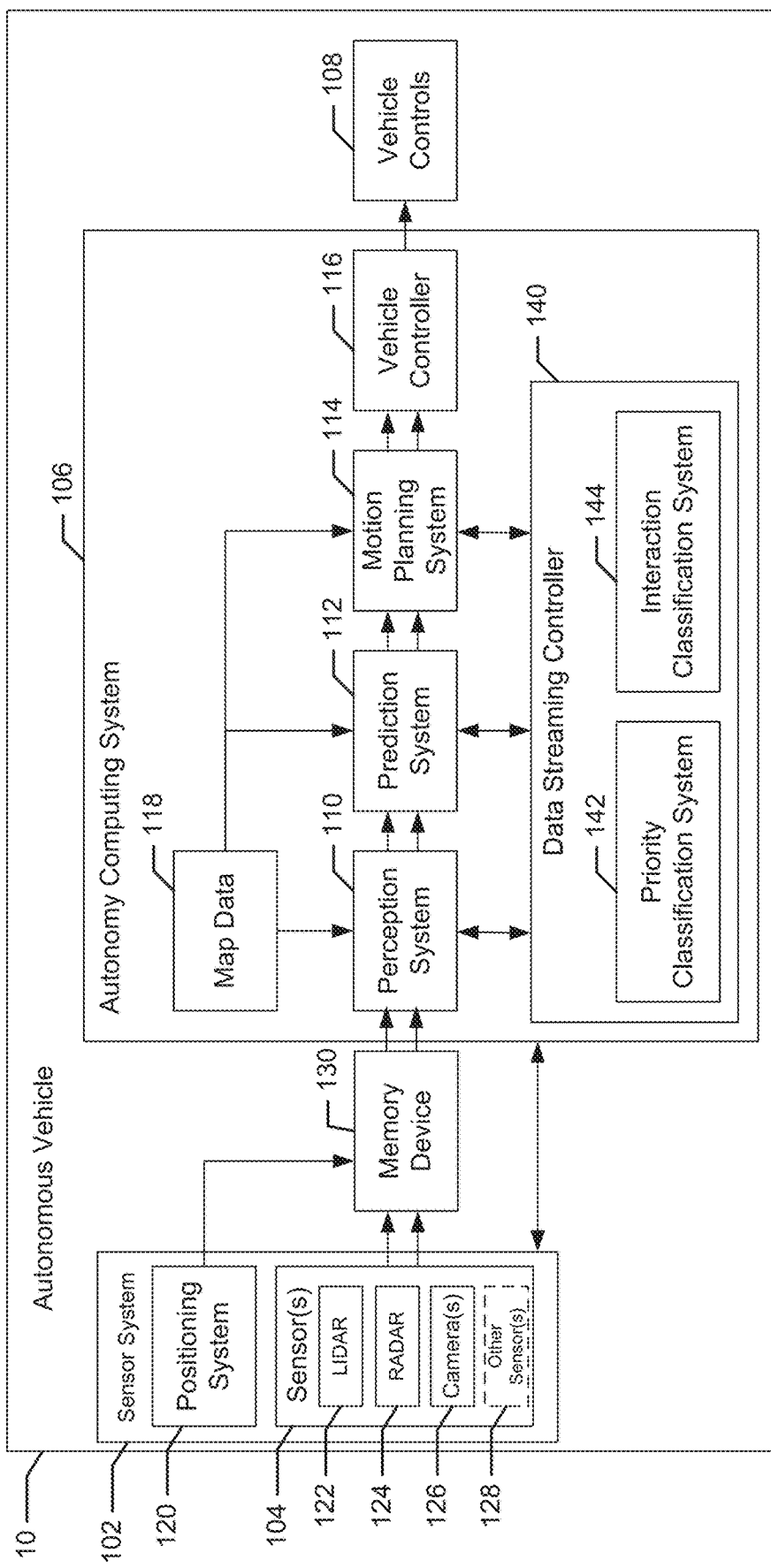
FIG. 1 depicts an example autonomy system for an autonomous vehicle according to example embodiments of the present disclosure.

Generally, the present disclosure is directed to systems and methods for streaming processing within one or more systems of an autonomy computing system. In particular, an autonomy computing system can include a plurality of systems. When an update for a particular object or region of interest is received by a given system, the system can control transmission of data associated with the update as well as a determination of other aspects by the given system. For example, the system can determine based on a received update for a particular aspect and a priority classification and/or interaction classification determined for that aspect whether data associated with the update should be transmitted to a subsequent system before waiting for other updates to arrive. By controlling transmission of autonomy data and determination of other aspects associated with autonomy data in a per aspect fashion (e.g., as updates per object or region of interest are determined) as opposed to a batch fashion (e.g., as updates for an entire scene or plurality of objects/regions are determined), autonomy data can be delivered to other systems in an advanced fashion (e.g., "ahead of schedule"). In such way, an autonomous vehicle can be controlled to react more quickly relative to aspects classified as high-priority. For example, the additional time gained through advancing the autonomy data in a streaming fashion can enable to vehicle to come to a stop more quickly or otherwise make improved maneuvers which enhance passenger and vehicle safety.

According to one particular aspect of the present disclosure, different systems within an autonomy computing system can be configured to receive autonomy data descriptive of updates for a subset of a scene of a surrounding environment of an autonomous vehicle. In some implementations, a scene corresponds to a 360 degree scene of an environment surrounding an autonomous vehicle. The subset of the scene can include a smaller portion of autonomy data than autonomy data descriptive of updates for an entirety of a scene. In some implementations, the subset of the scene can be associated with one or more objects of interest within the scene (e.g., one or more vehicles, pedestrians, bicycles, buildings, roads, etc.). In some implementations, the subset of the scene can be associated with one or more regions of interest within the scene (e.g., a region of interest proximate to a planned trajectory of an autonomous vehicle). For example, a subset of a 360 degree scene of an environment surrounding the autonomous vehicle can include an angular slice of the 360 degree scene (e.g., in the direction of the vehicle's planned trajectory). In some implementations, the subset of the scene includes an amount of sensor data that is less than an entire cycle of sensor data (e.g., less than a 360 degree scene of an environment).

According to another particular aspect of the present disclosure, an autonomy computing system can include a priority classification system. The priority classification system can be configured to determine a priority classification for objects perceived by an autonomous vehicle and/or regions of interest within a scene surrounding an autonomous vehicle. When an update of a first aspect of an object and/or region of interest is received, determining a second aspect of the object and/or region of interest can be determined based at least in part on the priority classification, thereby enabling higher priority objects and/or regions of interest to the analyzed before lower priority objects and/or regions of interest.

In some implementations, a priority classification for each aspect of a scene (e.g., an object and/or region of interest) can be indicative of an importance of the object and/or region of interest to a determination for a motion plan for the autonomous vehicle. As examples, the priority classification assigned to each object can be based on a plurality of factors, such as how likely an object is to interact with the autonomous vehicle, how soon an object is likely to interact with the autonomous vehicle, whether an object is likely to impact a motion plan for the autonomous vehicle, etc. For example, a vehicle traveling at a high rate of speed towards the autonomous vehicle can be classified as a higher priority object than a vehicle traveling away from the autonomous vehicle.

In some implementations, a priority classification for each aspect (e.g., object and/or region of interest) can be based on one or more heuristic processes. For example, one or more thresholds can be used to classify aspects based on one or more features of the aspect. For example, a minimum time duration, a minimum path, or a minimum distance to interaction with the autonomous vehicle can be used to classify the objects based on how far away the objects are from the autonomous vehicle or how soon the objects will likely interact with the autonomous vehicle. Similarly, a heading and/or velocity can be used to classify objects. For example objects traveling on headings away from the autonomous vehicle can be classified as lower priority than objects traveling towards the autonomous vehicle, and objects traveling at higher speeds towards the autonomous vehicle can be classified as higher priority than objects traveling at lower speeds towards the autonomous vehicle. Other features can be used as well, such as object type (e.g., vehicle, bicycle, pedestrian, etc.), object size, position, or any other feature described herein.

In some implementations, the priority classification system can classify each aspect according to a variety of different protocols. In one example, the priority classification system can classify each aspect as either high-priority or low-priority based on the respective feature data for each aspect. In some implementations, features for each high-priority aspect can be determined before features are determined for any low-priority aspect. In another example, the priority classification system can classify each object into one of a plurality of priority categories and/or rank each object relative to each other object (e.g., for Y objects, determine a rank of 1 to Y). The relative priority classification and/or rank for each object can be determined based on the feature data for each object. The priority classification for each object can be indicative of an importance of the object to a determination for a motion plan for the autonomous vehicle.

According to another particular aspect of the present disclosure, an autonomy computing system can include an interaction classification system. The interaction classification system can be part of the priority classification system or a separate system included in or otherwise accessed by the autonomy computing system. The interaction classification system can be configured to determine an interaction classification for objects and/or regions of interest. For example, an interaction classification can be indicative of one or more predetermined types of interactions among objects and/or regions of interest. For instance, determining an interaction classification between a first object and a second object can include determining that the first object and the second object are likely to collide given their current tracks/trajectories. In some implementations, determining an interaction classification includes accessing a dependence graph (e.g., an object dependence graph) that identifies interacting aspects (e.g., objects and/or regions of interest). Such a dependence graph can be iteratively updated as systems determine new portions of autonomy data related to the aspects of a scene of the surrounding environment of the autonomous vehicle. In this fashion, interaction classifications can help a system determine when it is appropriate to update its determined autonomy aspects based on asynchronously received updates for objects and/or regions of interest. By dynamically determining interaction dependencies and updating autonomy data in a streaming process, latency can be reduced and responsiveness can be improved within an autonomy computing system.

In some examples of the present disclosure, an interaction classification can be used to help determine when a system should initiate new autonomy data determinations upon receiving an update associated with a given object and/or region of interest as opposed to waiting for updates associated with one or more different objects and/or regions of interest. For example, a system can be configured to receive autonomy data associated with a first aspect of a first object (e.g., state data for the first object). An interaction classification system can determine that the first object has an interaction dependence on a second object, or vice versa. If autonomy data associated with a first aspect of the second object has not yet been received, an expected time estimate for receiving such autonomy data can be determined. When the expected time estimate is less than a threshold value, the system can wait for such data before determining a second aspect of the first and second objects based at least in part on the received first aspect of the first and second objects. When the expected time estimate is greater than a threshold value, or if the system waits for receipt of the autonomy data associated with the first aspect of the second object and doesn't receive it within the expected time estimate (e.g., because the second object is currently occluded), then the first aspect of the second object can be predicted. The system can then be configured to determine a second aspect of the first and second objects based at least in part on the received first aspect of the first object and the predicted first aspect of the second object.

According to another aspect of the present disclosure, the priority classification system and/or interaction classification system described herein can include or leverage one or more machine-learned models that assist in classifying each object perceived by the autonomous vehicle and/or region of interest within a scene of a surrounding environment of an autonomous vehicle. As one example, in some implementations, the priority classification system can include a machine-learned object classifier configured to classify each perceived object, such as by classifying each object as high-priority or low-priority. As another example, in some implementations, the interaction classification system can include a machine-learned object classifier configured to classify each perceived object, such as having one or more predetermined categories of interaction relative to one or more other objects. The use of machine-learned models can improve the speed, quality, and/or accuracy of object priority classification and/or interaction classification. The improved ability to classify objects according to priority and/or interaction can allow for more efficient use of autonomy computing system resources by, for example, allowing for aspects of higher priority objects to be determined before lower priority objects. Further, this can allow for the determined aspects for higher priority objects to be provided to other systems sooner, reducing overall latency within an autonomy stack and ultimately for determining a motion plan, thereby reducing autonomous vehicle response times and enhancing passenger safety and vehicle efficiency.

According to yet another aspect of the present disclosure, the machine-learned models included in or employed by the priority classification system(s) and/or interaction classification system(s) described herein can be trained using log data collected during actual operation of autonomous vehicles on travelways (e.g., roadways). For example, the log data can include sensor data and/or state data for various objects perceived by an autonomous vehicle (e.g., the perception system of an autonomous vehicle) and also the resulting future state for each object that occurred subsequent and/or contemporaneous to collection of the sensor data and/or generation of the state data. Thus, the log data can include a large number of real-world examples of objects paired with the data collected and/or generated by the autonomous vehicle (e.g., sensor data, map data, perception data, etc.) contemporaneous to such perception, such as whether the object became more or less likely to interact with the autonomous vehicle in the resulting future state of the object. Training the machine-learned models on such real-world log data can enable the machine-learned models to determine object classifications which better mirror or mimic real-world object behavior.

More particularly, in some implementations, an autonomous vehicle can include a computing system that assists in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the computing system can include a perception system, a prediction system, and a motion planning system that cooperate to perceive the surrounding environment of the autonomous vehicle and determine a motion plan for controlling the motion of the autonomous vehicle accordingly. For example, the perception system can perceive one or more objects that are proximate to an autonomous vehicle, and provide state data indicative of the one or more objects to the prediction system. The prediction system can then determine a predicted future state or track for each object perceived by the perception system. The motion planning system can then determine a motion plan for the autonomous vehicle based on the predicted future states or tracks for the objects. In this way, an autonomous vehicle can perceive objects proximate to the autonomous vehicle, and, in response, control the autonomous vehicle accordingly.

In some implementations, an autonomous vehicle can perform each of the perception, prediction, and motion planning steps sequentially using data obtained in a plurality of consecutive time frames. For example, for a time frame N, the perception system can receive sensor data for the time frame N; the perception system can concurrently generate and provide state data to the prediction system for one or more objects perceived by the perception system for a time frame N minus 1 (N−1); the prediction system can concurrently determine a predicted future state for each object perceived by the perception system for a time frame N minus 2 (N−2); and a motion planning system can concurrently determine a motion plan for the autonomous vehicle using predicted future states for a time frame N minus 3 (N−3).

Thus, a motion plan for the autonomous vehicle can be iteratively determined using data from each of a plurality of consecutive time frames.

However, in such an implementation, each of the perception, prediction, and motion planning systems may require the preceding system to complete a respective analysis of data for a time frame before each system can subsequently analyze the data for the time frame. For example, for each consecutive time frame, the perception system may need to complete an analysis of data obtained from one or more sensors on the autonomous vehicle in order to generate the state data used by the prediction system. Similarly, the prediction system may need to complete an analysis of state data for a time frame to determine a predicted future state for each object before the motion planning system can determine a motion plan for the autonomous vehicle. Thus, the overall time from when an object is sensed by a sensor until a motion plan is determined in response to the object may be dependent upon each system completing its respective analysis of the object along with all other objects perceived at the same time as the object.

In contrast, the systems and methods according to example aspects of the present disclosure can allow for determining a priority classification and/or interaction classification for objects perceived by an autonomous vehicle and/or regions of interest within a scene of the environment surrounding an autonomous vehicle. Based at least in part on the priority classification and/or interaction classification, determination of subsequent aspects of autonomy data can be implemented for some objects and/or regions of interest (e.g., higher priority and/or dependent objects) before other objects and/or regions of interest.

In the particular context of a sensor system for an autonomous vehicle, a sensor system can include at least one sensor that is coupled to or otherwise included within the autonomous vehicle. As examples, the at least one sensor can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle. In some implementations, the sensor data can be obtained at a plurality of consecutive cycles, the sensor data at each cycle including information descriptive of a 360 degree scene of an environment surrounding an autonomous vehicle.

In some implementations, a computing system can also include a memory device configured to store the sensor data as it becomes available from the at least one sensor. For example, the memory device can include a rolling buffer to which sensor data is written at a plurality of successive increments of the sensor data within each cycle of the sensor data. In some implementations, each successive increment of the sensor data within a cycle of the sensor data comprises an angular slice of the 360 degree scene of an environment surrounding an autonomous vehicle.

More particularly, the computing system can also include a data streaming controller configured to determine a subset of the sensor data at each cycle of the sensor data and initiate transfer of the subset of the sensor data at each cycle of the sensor data from the memory device to an autonomy system associated with the computing system. In some implementations, the data controller can initiate transfer of each successive increment of the sensor data within each cycle as soon as it is written to the rolling buffer or other memory device.

In some implementations, the data controller can also interact with a priority classification system that is configured to, for each cycle of the sensor data, determine at least one high-priority region of interest. Determining a subset of the sensor data at each cycle of the sensor data for which transfer to an autonomy system can be initiated can be based in part on the at least one high-priority region of interest.

In some implementations, the at least one high-priority region of interest is determined based on an expected location of an object within a second cycle of the sensor data, the expected location of the object being determined by analyzing a first cycle of the sensor data, wherein the second cycle of the sensor data is obtained subsequently to the first cycle of the sensor data.

In some implementations, the at least one high-priority region of interest can include an angular slice of the 360 degree scene of an environment surrounding an autonomous vehicle, the angular slice being inclusive of the object.

In some implementations, the at least one high-priority region of interest is determined based on a predicted future location of the autonomous vehicle as specified by a motion plan determined at least in part from the sensor data. For instance, the autonomous vehicle can determine a planned vehicle trajectory for the autonomous vehicle to follow and the region of interest can be associated with a location along the planned vehicle trajectory.

In some implementations, the priority classification system can be further configured to determine at least one high-priority region of interest for a third cycle of the sensor data. The at least one high-priority region of interest for the second cycle of the sensor data can at least partially overlap the at least one high-priority region of interest for the third cycle of the sensor data.

In some implementations, the priority classification system can be configured to classify respective portions of the sensor data at each cycle of the sensor data as having a particular priority classification such that the data streaming controller is configured to initiate transfer of the respective portions of the sensor data at each cycle of the sensor data based at least in part on the particular priority classification for the respective portions.

In the particular context of a perception system for an autonomous vehicle, a perception system can be configured to receive each subset of sensor data at each cycle transferred from the memory device and to generate, for each of a plurality of consecutive time frames, state data descriptive of at least a current state of each of a plurality of objects that are perceived within the sensor data. Based on sensor data received from the sensor system and/or the map data, the perception system can identify one or more objects that are proximate to the autonomous vehicle at each time frame. As an example, in some implementations, the perception system can segment the sensor data (e.g., the LIDAR data) into discrete object polygons and/or track objects frame-to-frame (e.g., iteratively over a number of consecutive time frames or periods).

In particular, in some implementations, the perception system can generate, for each object, state data that describes a current state of such object (also referred to as one or more features of the object). As examples, the state data for each object can describe an estimate of the object's: location (also referred to as position); speed (also referred to as velocity); acceleration; heading; yaw rate; orientation; size/footprint (e.g., as represented by a bounding polygon or other shape); type/class (e.g., vehicle, pedestrian, bicycle); distance from the autonomous vehicle; minimum path to interaction with the autonomous vehicle; a minimum time duration to interaction with the autonomous vehicle; and/or other state information and/or covariances of the above-described forms of state information. In some implementations, certain state data for an object can be used to determine one or more other features for the object. For example, in some implementations, an object's position, speed, acceleration, and/or heading can be used to determine a minimum path to interaction with the autonomous vehicle or a minimum time duration to interaction with the autonomous vehicle. The perception system can provide the state data to the priority classification system and/or the prediction system (e.g., iteratively for each time frame).

More particularly, a perception system can be configured to obtain a first portion of autonomy data descriptive of an update for a first feature (e.g., sensor data) for a first object detected within a surrounding environment of an autonomous vehicle. The perception system can determine a second object to have an interaction classification relative to the first object, the interaction classification being indicative of one or more predetermined types of interaction between objects. In some implementations, the interaction classification is indicative that the first object and the second object are likely to collide (and/or otherwise interact) given their current trajectories. In some implementations, the interaction classification is indicative of the first object and the second object being within a predetermined level of proximity to one another at one or more of a current time or future time. In some implementations, determining the interaction classification between first object and the second object can include accessing a dependence graph that identifies interacting objects. The interaction classification can help the perception system determine when it is appropriate to determine updated state data for an object based on asynchronously received updates for that object and/or other objects and/or regions of interest.

More particularly, if autonomy data associated with a first aspect (e.g., sensor data) of a second object has not yet been received by the perception system, an expected time estimate for receiving such autonomy data can be determined. When the expected time estimate is less than a threshold value, the perception system can wait for such data before determining updated state data for the first and second objects based at least in part on the received sensor data for the first and second objects. When the expected time estimate is greater than a threshold value, or if the perception system waits for receipt of the sensor data for the second object and doesn't receive it within the expected time estimate (e.g., because the second object is currently occluded), then sensor data for the second object can be predicted. The system can then be configured to determine state data for the first and second objects based at least in part on the received sensor data for the first object. In some implementations, the system can also be configured to coordinate transmission of portions of state data to a second system of the autonomy computing system (e.g., a prediction system).

In some implementations, the perception system can also be configured to determine a priority classification associated with one or more aspects of a scene (e.g., an object and/or region of interest). Transmission of updated portions of state data from the perception system to another system (e.g., a prediction system) can be coordinated at least in part based on the priority classification(s). In one example, determining a priority classification for each object in a plurality of objects can include classifying each object as either high-priority or low-priority. In another example, determining a priority classification for each object in a plurality of objects can include determining a priority classification value from within a predetermined range of values. In some implementations, an order can be determined in which the computing system determines state data for the plurality of objects based at least in part on the priority classification for each object. The state data can then be determined according to the order. Transmission of the state data can be controlled in an asynchronous fashion from the perception system to a prediction system or other system of an autonomy computing system.

In the particular context of a prediction system for an autonomous vehicle, a prediction system can be configured to receive asynchronous updates of state data for each object and to generate, for each of a plurality of consecutive time frames, a predicted future state/track for each object. For example, various prediction techniques can be used to predict the one or more future locations for the object(s) identified by the perception system. The prediction system can provide the predicted future locations of the objects to the motion planning system.

In some implementations, the prediction system can be a goal-oriented prediction system that generates one or more potential goals, selects one or more of the most likely potential goals, and develops one or more trajectories by which the object can achieve the one or more selected goals. For example, the prediction system can include a scenario generation system that generates and/or scores the one or more goals for an object and a scenario development system that determines the one or more trajectories by which the object can achieve the goals. In some implementations, the prediction system can include a machine-learned goal-scoring model, a machine-learned trajectory development model, and/or other machine-learned models.

More particularly, a prediction system can be configured to obtain a first portion of autonomy data descriptive of an update for a first feature (e.g., state data) for a first object detected within a surrounding environment of an autonomous vehicle. The prediction system can determine a second object to have an interaction classification relative to the first object, the interaction classification being indicative of one or more predetermined types of interaction between objects. In some implementations, the interaction classification is indicative that the first object and the second object are likely to collide given their current trajectories. In some implementations, the interaction classification is indicative of the first object and the second object being within a predetermined level of proximity to one another at one or more of a current time or future time. In some implementations, determining the interaction classification between first object and the second object can include accessing an object dependence graph that identifies interacting objects. The interaction classification can help the prediction system determine when it is appropriate to determine updated track data for an object based on asynchronously received updates for that object and/or other objects and/or regions of interest.

More particularly, if autonomy data associated with a first aspect (e.g., state data) of a second object has not yet been received by the prediction system, an expected time estimate for receiving such autonomy data can be determined. When the expected time estimate is less than a threshold value, the prediction system can wait for such data before determining updated track data for the first and second objects based at least in part on the received state data for the first and second objects. When the expected time estimate is greater than a threshold value, or if the prediction system waits for receipt of the state data for the second object and doesn't receive it within the expected time estimate (e.g., because the second object is currently occluded), then state data for the second object can be predicted. The system can then be configured to determine track data for the first and second objects based at least in part on the received state data for the first object. In some implementations, the system can also be configured to coordinate transmission of portions of track data to a second system of the autonomy computing system (e.g., a motion planning system).

In some implementations, the prediction system can also be configured to determine a priority classification associated with one or more aspects of a scene (e.g., an object and/or region of interest). Transmission of updated portions of track data from the prediction system to another system (e.g., a motion planning system) can be coordinated at least in part based on the priority classification(s). In one example, determining a priority classification for each object in a plurality of objects can include classifying each object as either high-priority or low-priority. In another example, determining a priority classification for each object in a plurality of objects can include determining a priority classification value from within a predetermined range of values. In some implementations, an order can be determined in which the computing system determines track data for the plurality of objects based at least in part on the priority classification for each object. The track data can then be determined according to the order. Transmission of the track data can be controlled in an asynchronous fashion from the prediction system to a motion planning system or other system of an autonomy computing system.

In the particular context of a motion planning system for an autonomous vehicle, the motion planning system can determine a motion plan for the autonomous vehicle based at least in part on the state data provided by the perception system and/or the predicted one or more future locations or tracks for the objects provided by the prediction system. Stated differently, given information about the current locations of proximate objects and/or predictions about the future locations of proximate objects, the motion planning system can determine a motion plan for the autonomous vehicle that best navigates the vehicle relative to the objects at their current and/or future locations.

As an example, in some implementations, the motion planning system operates to generate a new autonomous motion plan for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

In some implementations, the motion planning system can include an optimization planner that, for each instance of generating a new motion plan, searches (e.g., iteratively searches) over a motion planning space (e.g., a vehicle state space) to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner can be or include an iterative linear quadratic regulator or similar iterative solver.

Once the optimization planner has identified the optimal motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

According to an aspect of the present disclosure, the motion planning system can employ or otherwise include one or more cost functions that, when evaluated, provide a total cost for a particular candidate motion plan. The optimization planner can search over a motion planning space (e.g., a vehicle state space) to identify a motion plan that optimizes (e.g., locally optimizes) the total cost provided by the one or more cost functions.

In some implementations, different cost function(s) can be used depending upon a particular scenario that is selected by the motion planning system. For example, the motion planning system can include a plurality of scenario controllers that detect certain scenarios (e.g., a changing lanes scenario versus a queueing scenario) and guide the behavior of the autonomous vehicle according to the selected scenario. Different sets of one or more cost functions can correspond to the different possible scenarios and the cost function(s) corresponding to the selected scenario can be loaded and used by the motion planning system at each instance of motion planning.

In addition, according to another aspect of the present disclosure, the one or more cost functions used by the motion planning system can include a plurality of gains. Gains of the one or more cost functions can include coefficients, thresholds, or other configurable parameters of the one or more cost functions. For example, the cost function gains can serve to effectuate a balance between competing concerns (e.g., in the form of cost features) when the motion planning system generates an autonomous motion plan for the autonomous vehicle.

To provide an example for the purpose of illustration: an example cost function can provide, among other costs, a first cost that is negatively correlated to a magnitude of a first distance from the autonomous vehicle to a lane boundary. Thus, if a candidate motion plan approaches a lane boundary, the first cost increases, thereby discouraging (e.g., through increased cost penalization) the autonomous vehicle from selecting motion plans that come close to or cross over lane boundaries. The magnitude of the first distance from the autonomous vehicle to the lane boundary can be referred to as a "feature." The example cost function provides the first cost based on such feature. In particular, the example cost function includes a number of configurable parameters, including, for example, a threshold gain value that describes a certain magnitude of the first distance at which the first cost becomes greater than zero, a coefficient gain value that influences a rate at which the first cost increases as the magnitude of the first distance decreases, and/or other configurable parameters. As another example, the example cost function might provide, among other costs, a second cost that is negatively correlated to a magnitude of a second distance from the autonomous vehicle to a pedestrian. Thus, the motion planning system is discouraged from selecting motion plans that approach pedestrians. Again, the magnitude of the second distance can be referred to as a feature and the cost function can include a number of gains that control the influence of such feature on the total cost. In particular, the respective gains of the second cost and the first cost will effectuate a certain balance between the second cost and the first cost (e.g., it is more important to avoid approaching a pedestrian than it is to avoid crossing a lane boundary).

The example cost function described above is provided only as an example cost function to illustrate the principles of features, gains, and costs. Many other and different cost functions with different features and costs can be employed in addition or alternatively to the example cost function described above. In some optimization-based implementations, the cost function(s) should be C1 continuous in state variables at each time step. In addition, while only a first cost and a second cost are described above with respect to the example cost function, the cost functions of the present disclosure can include any number (e.g., hundreds) of different features, gains, and costs. As examples, additional costs can be assessed based on dynamics, speed limits, crosstrack (e.g., deviation from a center line of a lane), end of path, stop sign, traffic light, adaptive cruise control, static obstacles, etc. In some implementations, the cost function(s) are quadratic, linear, or a combination thereof. Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

In accordance with one aspect of the present disclosure, a computing system (e.g., a motion planning computing system) can be configured to receive autonomy data descriptive of an update for a first aspect of a scene of an environment surrounding the autonomous vehicle. In some implementations, the first aspect of the scene of the environment surrounding the autonomous vehicle includes a region of interest within the scene. In some implementations, the first aspect of the scene of the environment surrounding the autonomous vehicle includes an object perceived within the scene.

In some implementations, the computing system can be configured to determine a priority classification for the first aspect of the scene of the environment surrounding the autonomous vehicle. For example, in some implementations, determining a priority classification for the first aspect of the scene of the environment surrounding the autonomous vehicle can include determining a level of influence of the first aspect of the scene of the environment on a recently obtained motion plan for the autonomous vehicle.

In some implementations, the computing system can be additionally or alternatively configured to determine an interaction classification for the first aspect of the scene relative to other aspects of the scene of the environment surrounding the autonomous vehicle. For example, determining an interaction classification can involve accessing a dependence graph that identifies interacting aspects.

When one or more of the priority classification and the interaction classification for the first aspect is determined to meet one or more predetermined criteria, one or more discrete-type decisions relative to navigation of the autonomous vehicle can be determined and/or an optimized motion plan for the autonomous vehicle that is configured to control navigation of the autonomous vehicle in keeping with the discrete-type decision and that optimizes one or more cost functions can be determined.

In some implementations, the computing system can be configured to determine a set of one or more discrete-type decisions from a plurality of discrete-type decisions, the set of one or more discrete-type decisions corresponding to those discrete-type decisions that are based at least in part on the first aspect of the scene of the environment surrounding the autonomous vehicle. In this manner, when an update is received for the first aspect (e.g., an object or region of interest), only those discrete-type decisions that depend on the first aspect are updated, thus reducing latency and processing requirements by the motion planning system.

In some implementations, the computing system can be further configured to update a priority classification for the first aspect of the scene of the environment in a different system (e.g., a perception system and/or prediction system) other than the motion planning system. In this manner, when new aspects (e.g., objects and/or regions of interest) are determined by a motion planning system to have a higher priority, such priority classifications can be shared with other systems so that sensor data, state data and/or track data associated with the higher priority aspects can be received and processed more quickly by the motion planning system in future time frames.

The systems and methods described herein may provide a number of technical effects and benefits. For example, the systems and methods according to example aspects of the present disclosure can implement streaming processing of autonomy data as opposed to batch processing of autonomy data. In batch processing systems, system latencies can be introduced at various points within an autonomy stack. For example, a first latency can be introduced by waiting for sensor data for an entire 360 degree scene relative to an autonomous vehicle to be captured. A second latency can be introduced within a perception system to detect and track objects for an accumulated portion of sensor data corresponding to the entire 360 degree scene. A third latency can be introduced within one or more of a prediction system and/or motion planning system that further implements a pipeline approach for implementing batch analysis for a list of detected and tracked objects.

Systems and method according to example aspects of the present disclosure can advantageously remedy latency issues that arise during batch processing by streaming autonomy data updates on a per aspect fashion (e.g., as updates per object or region of interest are determined) as opposed to a batch fashion (e.g., as updates for an entire scene or plurality of objects/regions are determined). With streaming processing, autonomy data can be delivered to other systems in an advanced fashion (e.g., "ahead of schedule"). In such fashion, an autonomous vehicle can be controlled to react more quickly relative to aspects classified as high-priority. For example, the additional time gained through advancing the autonomy data in a streaming fashion can enable the vehicle to come to a stop more quickly or otherwise make improved maneuvers which enhance passenger and vehicle safety.

Another technical effect and benefit of the present disclosure is improved utilization of computing resources in an autonomy computing system. More particularly, a computing system can be configured to determine a priority classification and/or interaction classification for objects perceived by an autonomous vehicle. In particular, by applying one or more heuristic processes and/or using machine-learned models, the systems and methods of the present disclosure can determine a respective priority classification and/or interaction classification for a plurality of aspects of a scene (e.g., objects and/or regions of interest) of a surrounding environment of an autonomous vehicle. An order at which features are determined for each aspect can then be determined based at least upon the respective priority classification and/or independence classification for each aspect. The ability to classify objects according to a respective priority and/or interaction dependence can allow for computational resources to be focused on higher-priority objects.

As such, one technical effect and benefit of the present disclosure is reduced latency for determining features for higher priority aspects (e.g., objects and/or regions of interest) which are more likely to impact a motion plan for an autonomous vehicle than low-priority aspects. In particular, the present disclosure provides techniques that enable a computing system to determine a motion plan for an autonomous vehicle as soon as a predicted feature for all high-priority aspects has been determined. Thus, the present disclosure can allow for a reduction in the time required for an autonomous vehicle to perceive an object and determine a motion plan in response to the object. This can allow for more efficient use of computing resources on board an autonomous vehicle.

The present disclosure also provides additional technical effects and benefits, including, for example, enhancing passenger safety. For example, the systems and methods according to example aspects of the present disclosure can allow for reduced reaction times for determining a motion plan in response to an object perceived by the autonomous vehicle. This can allow an autonomous vehicle to come to a stop more quickly, navigate around the object, or otherwise respond to the object more quickly, thereby reducing the likelihood of an autonomous vehicle colliding with the object.

With reference now to the FIGS., example aspects of the present disclosure will be discussed in further detail.

FIG. 1 depicts a block diagram of an example autonomous vehicle 10 according to example aspects of the present disclosure. The autonomous vehicle 10 can include a sensor system 102, an autonomy computing system 106, and one or more vehicle controls 108. The autonomy computing system 106 can assist in controlling the autonomous vehicle 10. In particular, the autonomy computing system 106 can receive sensor data from the sensor system 102, attempt to comprehend the surrounding environment by performing various processing techniques on data collected by the sensor system 102, and generate an appropriate motion path through such surrounding environment. The vehicle autonomy system 106 can control the one or more vehicle controls 108 to operate the autonomous vehicle 10 according to the motion path.

As illustrated in FIG. 1, the autonomy computing system 106 can include a perception system 110, a prediction system 112, and a motion planning system 114 that cooperate to perceive the surrounding environment of the autonomous vehicle 10 and determine a motion plan for controlling the motion of the autonomous vehicle 10 accordingly.

In particular, in some implementations, the perception system 110 can receive sensor data from the sensor system 102 that is coupled to or otherwise included within the autonomous vehicle 10. As examples, the sensor system 102 can include one or more sensors 104, which can include a Light Detection and Ranging (LIDAR) system 122, a Radio Detection and Ranging (RADAR) system 124, one or more cameras 126 (e.g., visible spectrum cameras, infrared cameras, etc.), and/or other sensors 128. The sensor data can include information that describes the location of objects within the surrounding environment of the autonomous vehicle 10. The sensor data can include raw sensor data or sensor data that has been processed or manipulated in one or more fashions relative to the raw sensor data.

As one example, for a LIDAR system 122, the sensor data can include the location (e.g., in three-dimensional space relative to the LIDAR system 122) of a number of points that correspond to objects that have reflected a ranging laser. For example, a LIDAR system 122 can measure distances by measuring the Time of Flight (TOF) that it takes a short laser pulse to travel from the sensor to an object and back, calculating the distance from the known speed of light.

As another example, for a RADAR system 124, the sensor data can include the location (e.g., in three-dimensional space relative to the RADAR system 124) of a number of points that correspond to objects that have reflected a ranging radio wave. For example, radio waves (e.g., pulsed or continuous) transmitted by the RADAR system 124 can reflect off an object and return to a receiver of the RADAR system 124, giving information about the object's location and speed. Thus, a RADAR system 124 can provide useful information about the current speed of an object.

As yet another example, for one or more cameras 126, various processing techniques (e.g., range imaging techniques such as, for example, structure from motion, structured light, stereo triangulation, and/or other techniques) can be performed to identify the location (e.g., in three-dimensional space relative to the one or more cameras 126) of a number of points that correspond to objects that are depicted in imagery captured by the one or more cameras 126. Other sensors 128 can identify the location of points that correspond to objects as well.

Thus, the one or more sensors 104 can be used to collect sensor data that includes information that describes the location (e.g., in three-dimensional space relative to the autonomous vehicle 10) of points that correspond to objects within the surrounding environment of the autonomous vehicle 10. In some implementations, the sensors 104 can be located at various different locations on the autonomous vehicle 10. As an example, in some implementations, one or more cameras 126 and/or LIDAR sensors 122 can be located in a pod or other structure that is mounted on a roof of the autonomous vehicle 10 while one or more RADAR sensors 124 can be located in or behind the front and/or rear bumper(s) or body panel(s) of the autonomous vehicle 10. As another example, camera(s) 126 can be located at the front or rear bumper(s) of the vehicle 10 as well. Other locations can be used as well.

As another example, the sensor system 102 can include a positioning system 120. The positioning system 120 can determine a current position of the vehicle 10. The positioning system 120 can be any device or circuitry for analyzing the position of the vehicle 10. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

In addition to the sensor data, the perception system 103 can retrieve or otherwise obtain map data 118 that provides detailed information about the surrounding environment of the autonomous vehicle 10. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the autonomy computing system 106 in comprehending and perceiving its surrounding environment and its relationship thereto.

The perception system 110 can identify one or more objects that are proximate to the autonomous vehicle 10 based on sensor data received from the sensor system 102 and/or the map data 118. In particular, in some implementations, the perception system 110 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles) that are proximate to the autonomous vehicle 10 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 10 based at least in part on the predicted one or more future locations for the object and/or the state data for the object provided by the perception system 110. Stated differently, given information about the current locations of objects and/or predicted future locations of proximate objects, the motion planning system 114 can determine a motion plan for the autonomous vehicle 10 that best navigates the autonomous vehicle 10 relative to the objects at such locations. In some implementations, the motion planning system 114 can determine the motion plan for the autonomous vehicle using one or more adjusted vehicle parameters, as described herein.

In some implementations, the motion planning system 114 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 114 can determine a total cost (e.g., a sum of the cost(s) and/or reward(s) provided by the cost function(s) and/or reward function(s)) of adhering to a particular candidate pathway. The motion planning system 114 can select or determine a motion plan for the autonomous vehicle 10 based at least in part on the cost function(s) and the reward function(s). For example, the motion plan that minimizes the total cost can be selected or otherwise determined. The motion planning system 114 can provide the selected motion plan to a vehicle controller 116 that controls one or more vehicle controls 108 (e.g., actuators or other devices that control gas flow, steering, braking, etc.) to execute the selected motion plan.

According to example aspects of the present disclosure, the autonomy computing system 106 can also include a memory device 130 configured to store sensor data from the one or more sensors 104 as it becomes available. For example, the memory device 130 can include a rolling buffer to which sensor data is written at a plurality of successive increments of the sensor data within each cycle. In some implementations, each successive increment of the sensor data within a cycle of the sensor data comprises an angular slice of the 360 degree scene of an environment surrounding an autonomous vehicle, as discussed further with respect to FIGS. 2 and 3.

According to example aspects of the present disclosure, the autonomy computing system 106 can also include a data streaming controller 140 configured to coordinate streaming processing within one or more systems of autonomy computing system 106 (e.g., the perception system 110, prediction system 112, and/or motion planning system 114). More particularly, when an update for a particular aspect (e.g., an object or region of interest) is received by a given system, the data streaming controller 140 can help control transmission of data associated with the update as well as a determination of other aspects by the given system. For example, the data streaming controller 140 can determine based on a received update for a particular aspect and a priority classification (e.g., as determined by priority classification system 142) and/or interaction classification determined for that aspect (e.g., as determined by interaction classification system 144) whether data associated with the update should be transmitted to a subsequent system before waiting for other updates to arrive. By controlling transmission of autonomy data and determination of other aspects associated with autonomy data in a per aspect fashion (e.g., as updates per object or region of interest are determined) as opposed to a batch fashion (e.g., as updates for an entire scene or plurality of objects/regions are determined), autonomy data can be delivered to other systems in an advanced fashion (e.g., "ahead of schedule"). In such way, autonomous vehicle 10 can be controlled to react more quickly relative to aspects classified as high-priority. For example, the additional time gained through advancing the autonomy data in a streaming fashion can enable to vehicle to come to a stop more quickly or otherwise make improved maneuvers which enhance passenger and vehicle safety.

According to another particular aspect of the present disclosure, autonomy computing system 106 can include a priority classification system 142. The priority classification system 142 can be configured to determine a priority classification for objects perceived by autonomous vehicle 10 and/or regions of interest within a scene surrounding autonomous vehicle 10. When an update of a first aspect of an object and/or region of interest is received, determining a second aspect of the object and/or region of interest can be determined based at least in part on the priority classification, thereby enabling higher priority objects and/or regions of interest to the analyzed before lower priority objects and/or regions of interest.

In some implementations, a priority classification for each aspect of a scene (e.g., an object and/or region of interest) can be indicative of an importance of the object and/or region of interest to a determination for a motion plan for the autonomous vehicle 10. As examples, the priority classification assigned to each object can be based on a plurality of factors, such as how likely an object is to interact with the autonomous vehicle 10, how soon an object is likely to interact with the autonomous vehicle 10, whether an object is likely to impact a motion plan for the autonomous vehicle 10, etc. For example, a vehicle traveling at a high rate of speed towards the autonomous vehicle 10 can be classified as a higher priority object than a vehicle traveling away from the autonomous vehicle 10.

In some implementations, a priority classification for each aspect (e.g., object and/or region of interest) can be based on one or more heuristic processes. For example, one or more thresholds can be used to classify aspects based on one or more features of the aspect. For example, a minimum time duration, a minimum path, or a minimum distance to interaction with the autonomous vehicle 10 can be used to classify the objects based on how far away the objects are from the autonomous vehicle 10 or how soon the objects will likely interact with the autonomous vehicle 10. Similarly, a heading and/or velocity can be used to classify objects. For example, objects traveling on headings away from the autonomous vehicle 10 can be classified as lower priority than objects traveling towards the autonomous vehicle 10, and objects traveling at higher speeds towards the autonomous vehicle 10 can be classified as higher priority than objects traveling at lower speeds towards the autonomous vehicle 10. Other features can be used as well, such as object type (e.g., vehicle, bicycle, pedestrian, etc.), object size, position, or any other feature described herein.

In some implementations, the priority classification system 142 can classify each aspect according to a variety of different protocols. In one example, the priority classification system 142 can classify each aspect as either high-priority or low-priority based on the respective feature data for each aspect. In some implementations, features for each high-priority aspect can be determined before features are determined for any low-priority aspect. In another example, the priority classification system 142 can classify each object into one of a plurality of priority categories and/or rank each object relative to each other object (e.g., for Y objects, determine a rank of 1 to Y). The relative priority classification and/or rank for each object can be determined based on the feature data for each object. The priority classification for each object can be indicative of an importance of the object to a determination for a motion plan for the autonomous vehicle 10.

According to another particular aspect of the present disclosure, autonomy computing system 106 can include an interaction classification system 144. The interaction classification system 144 can be part of the priority classification system 142 or a separate system included in or otherwise accessed by the autonomy computing system 106. The interaction classification system 144 can be configured to determine an interaction classification for objects and/or regions of interest. For example, an interaction classification can be indicative of one or more predetermined types of interactions among objects and/or regions of interest. For instance, determining an interaction classification between a first object and a second object can include determining that the first object and the second object are likely to collide given their current tracks/trajectories. In some implementations, determining an interaction classification includes accessing a dependence graph (e.g., an object dependence graph) that identifies interacting aspects (e.g., objects and/or regions of interest). Such a dependence graph can be iteratively updated as systems determine new portions of autonomy data related to the aspects of a scene of the surrounding environment of the autonomous vehicle. In this fashion, interaction classifications can help a system determine when it is appropriate to update its determined autonomy aspects based on asynchronously received updates for objects and/or regions of interest. By dynamically determining interaction dependencies and updating autonomy data in a streaming process, latency can be reduced and responsiveness can be improved within an autonomy computing system.

In some examples of the present disclosure, an interaction classification can be used to help determine when a system should initiate new autonomy data determinations upon receiving an update associated with a given object and/or region of interest as opposed to waiting for updates associated with one or more different objects and/or regions of interest. For example, a system can be configured to receive autonomy data associated with a first aspect of a first object (e.g., state data for the first object). An interaction classification system 144 can determine that the first object has an interaction dependence on a second object, or similarly that a second object has an interaction dependence on the first object. If autonomy data associated with a first aspect of the second object has not yet been received, an expected time estimate for receiving such autonomy data can be determined. When the expected time estimate is less than a threshold value, the system can wait for such data before determining a second aspect of the first and second objects based at least in part on the received first aspect of the first and second objects. When the expected time estimate is greater than a threshold value, or if the system waits for receipt of the autonomy data associated with the first aspect of the second object and doesn't receive it within the expected time estimate (e.g., because the second object is currently occluded), then the first aspect of the second object can be predicted. The system can then be configured to determine a second aspect of the first and second objects based at least in part on the received first aspect of the first object and the predicted first aspect of the second object.

Each of the perception system 110, the prediction system 112, the motion planning system 114, the vehicle controller 116, the data streaming controller 140, the priority classification system 142, and the interaction classification system 144 can include computer logic utilized to provide desired functionality. In some implementations, each of the perception system 110, the prediction system 112, the motion planning system 114, the vehicle controller 116, the data streaming controller 140, the priority classification system 142, and the interaction classification system 144 can be implemented in hardware, firmware, and/or software controlling a general purpose processor. For example, in some implementations, each of the perception system 110, the prediction system 112, the motion planning system 114, the vehicle controller 116, the data streaming controller 140, the priority classification system 142, and the interaction classification system 144 includes program files stored on a storage device, loaded into a memory and executed by one or more processors. In other implementations, each of the perception system 110, the prediction system 112, the motion planning system 114, the vehicle controller 116, the data streaming controller 140, the priority classification system 142, and the interaction classification system 144 includes one or more sets of computer-executable instructions that are stored in a tangible computer-readable storage medium such as RAM hard disk or optical or magnetic media.

Figure 2:
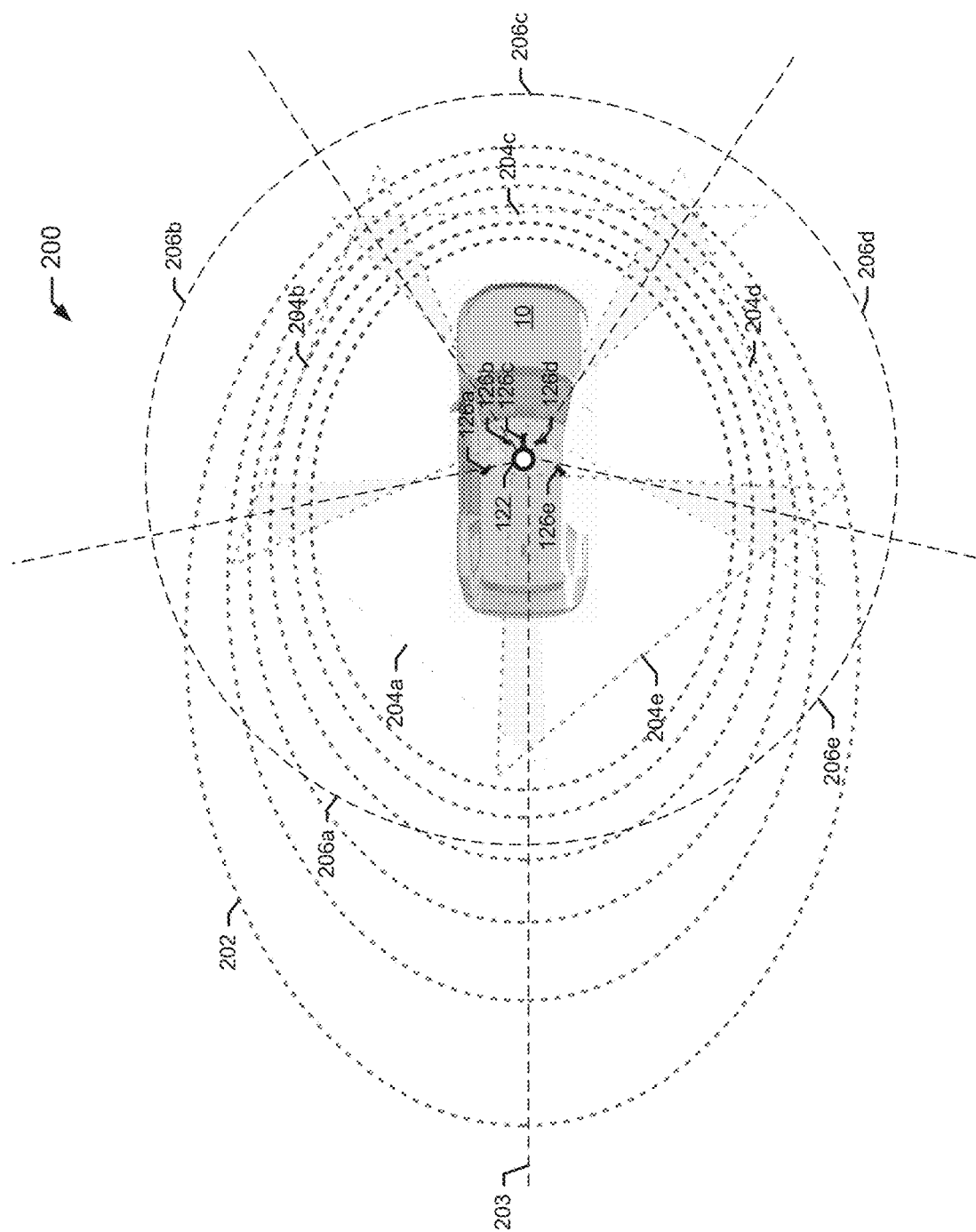
FIG. 2 depicts a first aspect of sensor data obtained for a scene of an environment surrounding an autonomous vehicle according to example embodiments of the present disclosure.

Referring now to FIG. 2, a first aspect of sensor data obtained for a scene 200 of an environment surrounding an autonomous vehicle 10 is depicted according to example embodiments of the present disclosure. Elements that are the same or similar to those shown in FIG. 1 are referred to with the same reference numerals. The example scene 200 depicted in FIG. 2 corresponds to a 360 degree scene of an environment surrounding autonomous vehicle 10. Sensor data can be obtained by a sensor system associated with autonomous vehicle 10, for example, such as corresponding to sensor system 102 of FIG. 1. FIG. 2 illustrates example sensor data obtained by a Light Detection and Ranging (LIDAR) system and a plurality of cameras.

More particularly, a LIDAR system 122 can obtain LIDAR sweep data 202 within an approximately 360 degree field of view around autonomous vehicle 10. LIDAR sweep data 202 is visually depicted as a collection of data points obtained around the periphery of autonomous vehicle 10 as LIDAR system 122 measure distances to objects in the scene 200 by measuring the Time of Flight (TOF) that it takes a short laser pulse to travel from a sensor of LIDAR system 122 to an object and back, calculating the distance from the known speed of light. In some implementations, LIDAR system 122 can have a number of data channels (e.g., 32 channels, 64 channels) and an angular range (e.g., 360 degrees). Each LIDAR system channel can correspond, for example, to a unique light source (e.g., laser) from which a short light pulse (e.g., laser pulse) is emitted and a corresponding Time of Flight (TOF) distance measurement is received corresponding to the time it takes the pulse to travel from the sensor to an object and back. LIDAR sweep data 202 can be progressively obtained at different points within the 360-degree angular range of LIDAR sensor 122. For example, if each cycle of LIDAR sweep data 202 starts at point 203 within scene 200, then respective columns of LIDAR sweep data 202 can be progressively obtained starting at the rear of autonomous vehicle 10, working clockwise around the autonomous vehicle 10, until the LIDAR system 122 rotates back to point 203. Each 360-degree sweep can be referred to as a cycle of the LIDAR sweep data 202.

Still further, FIG. 2 depicts a plurality of cameras 126a-126e that are configured to respectively obtain a plurality of portions of image data corresponding to the respective fields of view 204a-204e of the plurality of cameras 126a-126e. The plurality of cameras 126a-126e can be positioned in predetermined locations relative to autonomous vehicle 10 such that the corresponding fields of view 204a-204e of each of the plurality of cameras 126a-126e covers a subset of the scene 200 of the surrounding environment of autonomous vehicle 10. In some implementations, the subset of the scene 200 associated with each camera 126a-126e can correspond, for example, to the range of the scene (e.g., 360 degrees) divided by the number of cameras (e.g., five), which corresponds to 72 degrees. In some implementations, the actual field of view 204a-204e associated with each 72-degree subset of the 360-degree scene can be slightly larger in order to provide slightly overlapping fields of view to facilitate detection of objects that may be located at the intersection of two adjacent fields of view. The combined field of view (e.g., the combination of fields of view 204a-204b) of the plurality of cameras 126a-126e can provide an approximately 360 degree field of view around the LIDAR system 122 or the periphery of the autonomous vehicle 10.

The plurality of cameras 126a-126e depicted in FIG. 2 corresponds to five cameras having a wide field of view to provide the adequate fields of view surrounding an autonomous vehicle. For example, the plurality of cameras 126a-126e may include a forward-facing camera 126c, two forward side cameras 126b, 126d, and two rear side cameras 126a, 126e. It should be appreciated that other numbers of cameras can be used to provide an adequate field of view surrounding the autonomous vehicle. As one example, six cameras including a forward-facing camera, two forward side cameras, two rear side cameras, and a rear-facing camera, can be used. In some implementations, more or less cameras can be utilized.

Streaming processing according to example embodiments of the disclosed technology helps to relay sensor data such as depicted in FIG. 2 as it becomes available from each sensor. As mentioned before, this sensor data can correspond to raw sensor data or to sensor data that has been processed or manipulated in one or more fashions relative to the raw sensor data. This is in contrast with waiting to relay sensor data in a batch process at the end of each cycle. For instance, the sensor data including LIDAR sweep data 202 and image data corresponding to fields of view 204a-204b can be obtained at a plurality of consecutive cycles, the sensor data at each cycle including information descriptive of a 360 degree scene 200 of an environment surrounding an autonomous vehicle. In some implementations, each cycle of the sensor data can take a fixed amount of time (e.g., 100 ms) corresponding to the amount of time it takes LIDAR system 122 to finish a 360 degree sweep.

In some implementations, instead of waiting to obtain an entire cycle of sensor data before relaying sensor data to other autonomy system components, latency can be reduced by sending a subset of the sensor data at each cycle. In one implementation, LIDAR sweep data can be relayed to a memory device (e.g., memory device 130 of FIG. 1) as soon as the LIDAR sweep data 122 becomes available from LIDAR system 122. For example, the LIDAR sweep data can be read to a rolling buffer in a plurality of successive increments within each 360-degree cycle of the sensor data. In one implementation, each successive increment of the sensor data corresponds to an angular slice of the 360 degree scene of an environment surrounding an autonomous vehicle. For instance, each successive increment of the sensor data (e.g., image data from cameras 126a-126e and LIDAR sweep data 202) can correspond to an angular slice corresponding to the range of the sensor data (e.g., 360 degrees) divided by the number of cameras. In the particular example of FIG. 2, each successive increment of the sensor data can correspond to a 72-degree angular slice. In this fashion, sensor data associate with a first angular slice 206a can be first read to a memory device or otherwise relayed from the sensors (e.g., LIDAR system 122 and camera 126a), followed by sensor data associated with a second angular slice 206b from LIDAR system 122 and camera 126b, followed by sensor data associated with a third angular slice 206c from LIDAR system 122 and camera 126c, followed by sensor data associated with a fourth angular slice 206d from LIDAR system 122 and camera 126d, followed by sensor data associated with a fifth angular slice 206e from LIDAR system 122 and camera 126e. New subsets of sensor data updates can thus be relayed much more quickly relative to the time the corresponding subsets of sensor data are obtained. Latency rates for sensor data relay can thus be improved based on the subset size relative to the cycle size. In the specific example of FIG. 2, if the cycle time to obtain sensor data for an entire 360 degree scene takes 100 ms, sensor data associated with a first angular slice can be read or relayed after only 20 ms as opposed to waiting 100 ms, thus reducing latency rates for sensor data relay by a factor of five.

In other examples, individual columns of LIDAR sweep data 202 can be relayed to memory device 130 and/or perception system 110. Using current LIDAR technology, such individual columns of LIDAR sweep data can be available within 5 ms as opposed to waiting 100 ms to progressively scan an entire 360-degree scene. Still further, a reduction in input buffering times can be applied to other portions of sensor data than the LIDAR sweep data 202. For instance, image data also have significant input buffering time. In some instances, although image exposure may only last 5 ms, it can take 20 ms to read the image data from an image sensor associated with a camera. In some implementations, an image processing pipeline can be structured to do significant image processing while the image is still being read (e.g., processing the image row by row as it becomes available). This approach can also be applied to LIDAR sweep data 202 obtained by a LIDAR system 122 and/or RADAR data obtained by a RADAR system 124.

Figure 3:
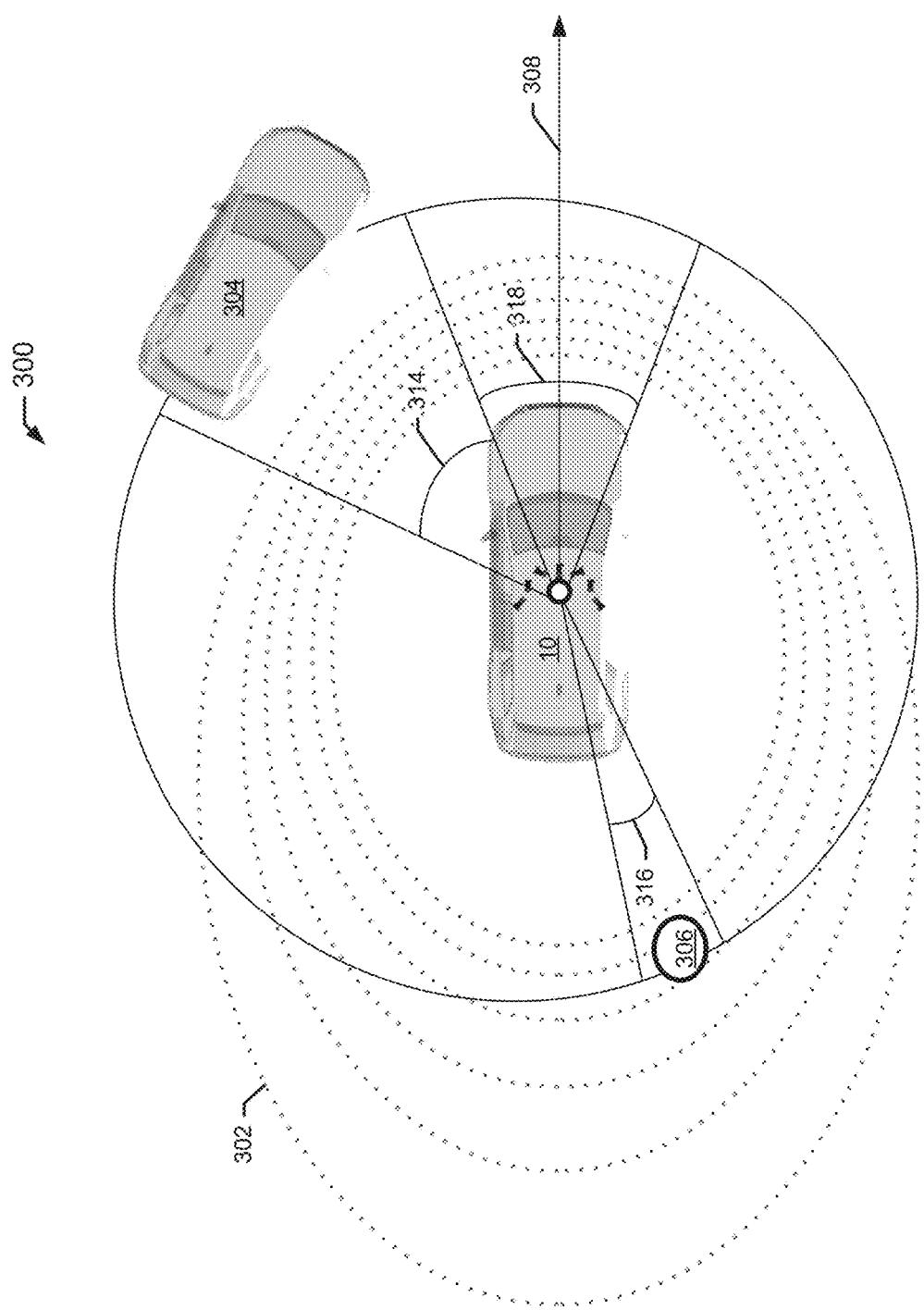
FIG. 3 depicts a second aspect of sensor data obtained for a scene of an environment surrounding an autonomous vehicle according to example embodiments of the present disclosure.

Referring now to FIG. 3, a second aspect of sensor data obtained for a scene 300 of an environment surrounding an autonomous vehicle 10 is depicted according to example embodiments of the present disclosure. The example scene 300 depicted in FIG. 3 corresponds to a 360 degree scene of an environment surrounding autonomous vehicle 10. Sensor data can be obtained by a sensor system associated with autonomous vehicle 10, for example, such as corresponding to sensor system 102 of FIG. 1. FIG. 3 illustrates example LIDAR sweep data 302 obtained by a Light Detection and Ranging (LIDAR) system 122, although other sensor data can additionally or alternatively be obtained.

FIG. 3 depicts an example of subsets of sensor data (e.g., LIDAR sweep data 122) that can be relayed as updates instead of waiting to relay an entire 360 degree cycle of LIDAR sweep data 122. In some implementations, the subset of the scene 300 can be associated with one or more objects of interest within the scene. In one example, a first subset of scene 300 can be associated with a vehicle 304. For example, vehicle 304 can be identified as an aspect having a high priority classification. As such, when angular slice 314 of sensor data associated with vehicle 304 is obtained by LIDAR system 122, it can be immediately read (e.g., read to memory device 130 of FIG. 1) or relayed (e.g., relayed to the autonomy computing system 106) as opposed to waiting to obtain an entire 360-degree cycle of LIDAR data. In another example, a second subset of scene 300 can be associated with a pedestrian 306. When angular slice 316 of sensor data associated with pedestrian 306 is obtained by LIDAR system 122, it can be immediately read or relayed to the autonomy system. In a still further example, a third subset of scene 300 can be associated with a region of interest proximate to a planned trajectory 308 of autonomous vehicle 10. When angular slice 318 of sensor data associated with the region of interest proximate to planned trajectory 308 is obtained by LIDAR system 122, it can be immediately read or relayed to the autonomy system. By configuring relay of sensor data in a manner as represented by FIG. 3, latency rates for relay of relevant sensor data pertaining to objects of interest and/or regions of interest can be substantially reduced.

For example, a subset of a 360 degree scene of an environment surrounding the autonomous vehicle can include an angular slice of the 360 degree scene (e.g., in the direction of the vehicle's planned trajectory). In some implementations, the subset of the scene includes an amount of sensor data that is less than sensor data for an entire cycle (e.g., less than a 360 degree scene of an environment).

Referring now to FIG. 4, a diagram of an example object prediction process according to example aspects of the present disclosure is shown. It should be appreciated that the improvements relative to the object prediction process can also be translated to object perception (e.g., as implemented by perception system 110) and/or motion planning (e.g., as implemented by motion planning system 114).

As represented in FIG. 4, in some implementations, a vehicle computing system can iteratively determine a motion plan using data obtained in a plurality of consecutive time frames. For example, each of the perception, prediction, and motion planning systems illustrated in FIG. 1 can concurrently perform analysis on data from a plurality of consecutive time frames. As an example, for a time frame N, the perception system can receive sensor data for the time frame N; the perception system can concurrently generate and provide state data to the prediction system for one or more objects perceived by the perception system for a time frame N−1; the prediction system can concurrently determine a predicted future state for each object perceived by the perception system for a time frame N−2; and a motion planning system can concurrently determine a motion plan for the autonomous vehicle using predicted future states for a time frame N−3. In a subsequent time frame N+1, each of the perception, prediction, and motion planning systems can receive and perform a respective analysis of data received from an upstream system, resulting in the motion planning system determining a motion plan using predicted future states for a time frame N−2. In this way, a motion plan for the autonomous vehicle can be iteratively determined using data from each of a plurality of consecutive time frames.

For example, as shown in FIG. 4, block 410 represents analysis by a perception system for data from a frame N. As shown, the perception system's analysis of data for frame N can include a plurality of objects 411A-J. Each of the objects can have associated state data descriptive of the object generated by the perception system. For example, for each object 411A-J, the perception system can generate state data describing a position, velocity, acceleration, heading, size, type, yaw rate, or other state data descriptive of the object as described herein.

As represented by the arrow from block 410 to block 430, the state data descriptive of the objects 411A-J generated by the perception system for frame N can be provided to the prediction system once the perception system has completed its analysis.

According to example aspects of the present disclosure, however, the prediction system can also receive a priority classification for each object. For example, in some implementations, each object can be classified as either high-priority ("HP") or low-priority ("LP"). As described herein, the priority classification for each object can be determined based on the respective state data for each object. Further, in some implementations, the priority classification can be determined by a machine-learned model.

Thus, as represented by block 430, the prediction system can receive the respective priority classifications for each object as well as the respective state data describing each object from the perception system. The perception system can then determine a predicted future state for each object based at least in part on the respective priority classification for each object. For example, in some implementations, the prediction system can first determine a predicted future state for each object classified as high-priority. For example, as shown in FIG. 4, the prediction system can first determine a predicted future state for HP objects 431A-D. Stated differently, the prediction system can determine a predicted future state for each object classified as high-priority based at least in part on the state data obtained for the most recent time frame (Frame N).

According to additional example aspects of the present disclosure, once the prediction system has determined a predicted future state for each object classified as high-priority, the prediction system can provide the predicted future state for each object classified as high-priority for the current timeframe to the motion planning system. For example, as shown by the arrow from the dashed block 440 to the block 450, once the prediction system has determined a predicted future state for each high-priority object HP 431A-D, the prediction system can provide the predicted future states for the objects HP 431A-D to the motion planning system. In this way, the motion planning system can begin determining a motion plan in an advanced fashion (e.g., "ahead of schedule").

According to additional example aspects of the present disclosure, once the prediction system has determined a predicted future state for each object classified as high-priority, the prediction system can determine a predicted future state for each object identified as low-priority. For example, after the prediction system has provided the high-priority objects HP 431A-D to the motion planning system, the prediction system can determine a predicted future state for each low priority object LP 431E-J. In this way, each object perceived in a particular frame (e.g., frame N) can have a predicted future state determined by the prediction system.

In some implementations, the prediction system can further be configured to provide a predicted future state for the previous sequential timeframe for each object classified as low-priority to the motion planning system concurrently with the predicted future state for each object classified as high-priority for the current timeframe. Stated differently, in some implementations, a predicted future state for a low-priority object can be determined by selecting, obtaining, or otherwise determining a predicted future state for the object based on state data obtained for a previous sequential time frame.

For example, as shown by block 420, the prediction system can have previously determined a predicted future state for objects 421A-J, including high-priority objects HP 421A-D and low-priority objects LP 421E-J. For example, as the perception system generated state data for objects 411A-J for time frame N in block 410, the prediction system could concurrently determine predicted future states for high-priority objects HP 421A-D and low-priority objects LP 421E-J for time frame N−1 in block 420. Further, as an example, each high-priority object HP 421A-D can respectively correspond to each high-priority object HP 431A-D for the time frame N−1, whereas each low-priority object LP 421E-J can respectively correspond to each low-priority object LP 431E-J for the time frame N−1.

Thus, as represented by the arrow from block 440 to block 450, when the prediction system provides the predicted future states for high-priority objects HP 431A-D to the motion planning system, the prediction system can be configured to concurrently provide a previously determined predicted future state for each low-priority object (i.e., LP 431E-J) for the previous sequential time frame (i.e., LP 421E-J). In this way, a full set of predicted future states comprising the predicted future states for all high-priority objects (HP 431A-D) for a current time frame and a previously determined predicted future state for all low-priority objects (LP 421E-J) for a previous sequential time frame can be concurrently provided to a motion planning system as soon as the prediction system has determined a predicted future state for each object classified as high-priority (HP 431A-D).

An advantage provided by the object prediction process depicted in FIG. 4 is that the time required to determine a motion plan for an autonomous vehicle can be reduced. For example, for a vehicle autonomy system such as the sequential vehicle autonomy system described herein, the motion planning system can receive a predicted future state for each object much sooner, thereby allowing a motion plan to be determined ahead of schedule. Further, the reduction in time for the prediction system to determine a predicted future state for each object can correspond to the ratio of high-priority objects to low-priority objects. For example, as depicted in FIG. 4, the prediction system would only need to determine a predicted future state for high-priority objects HP 431A-D (i.e., 4 out of 10 objects) for time frame N before providing the predicted future states for each object 431A-D and 421E-J to the motion planning system, allowing for a reduction of approximately 60% of the required processing time.

Further, because low-priority objects can be classified as such based on their negligible impact on a motion plan, using a predicted future state for a low-priority object from a previous sequential time frame can allow for a net increase in passenger and autonomous vehicle safety. For example, low-priority objects, such as objects positioned far away from an autonomous vehicle and traveling away from the autonomous vehicle, may be unlikely to impact the motion plan for the autonomous vehicle. However, high-priority objects, such as objects travelling towards the autonomous vehicle or positioned near the autonomous vehicle, may be much more likely to impact a motion plan for the autonomous vehicle. By allowing for such high-priority objects to be sensed by the sensors, perceived by the perception system, predicted by the prediction system, and planned for by the motion planning system in a reduced amount of time, the autonomous vehicle can respond to high-priority objects in a quicker fashion, thereby reducing the likelihood of unsafe conditions, such as a collision.

Figure 4A:
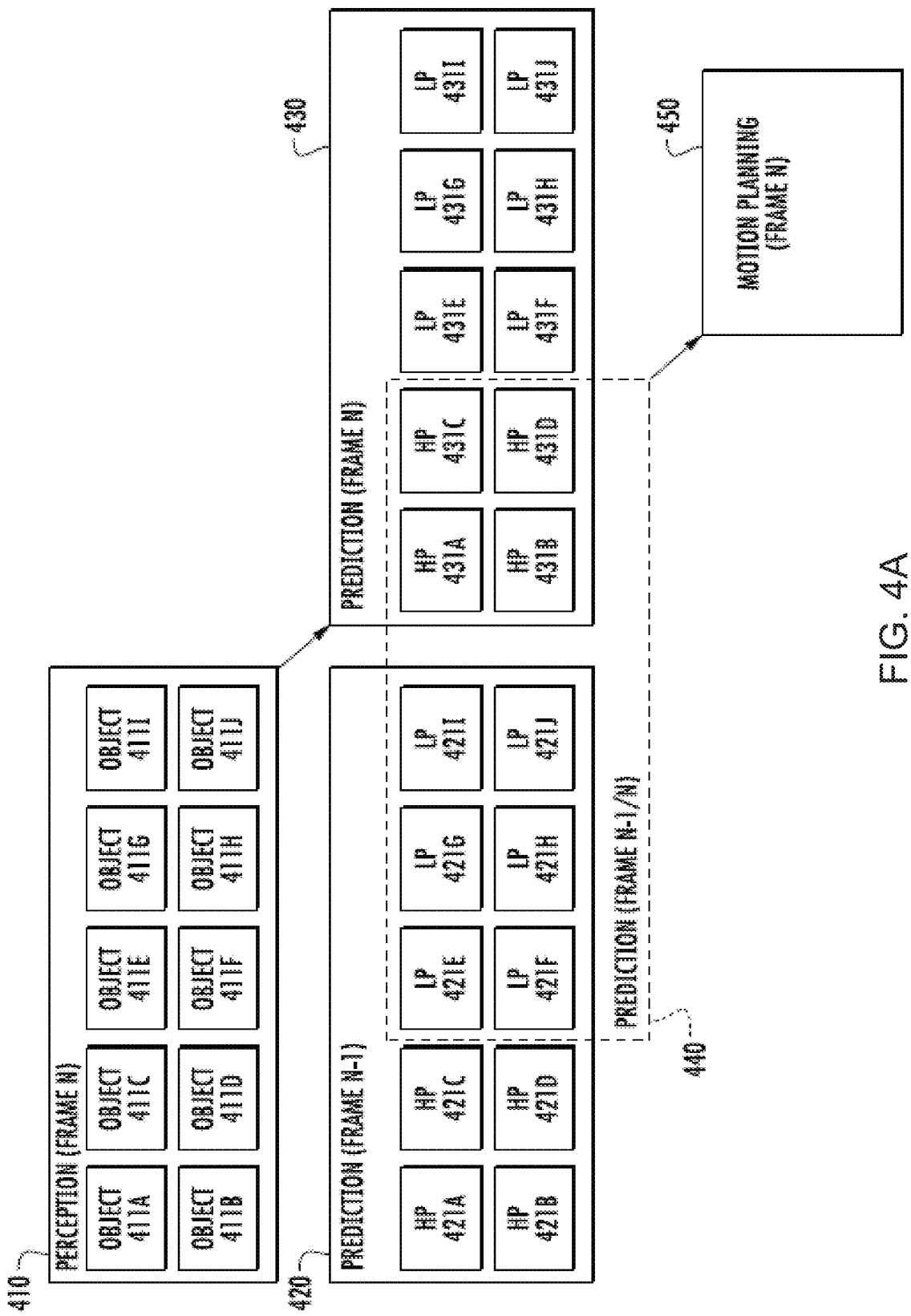
FIG. 4A depicts a block diagram of an example object prediction process according to example aspects of the present disclosure.
Figure 4B:
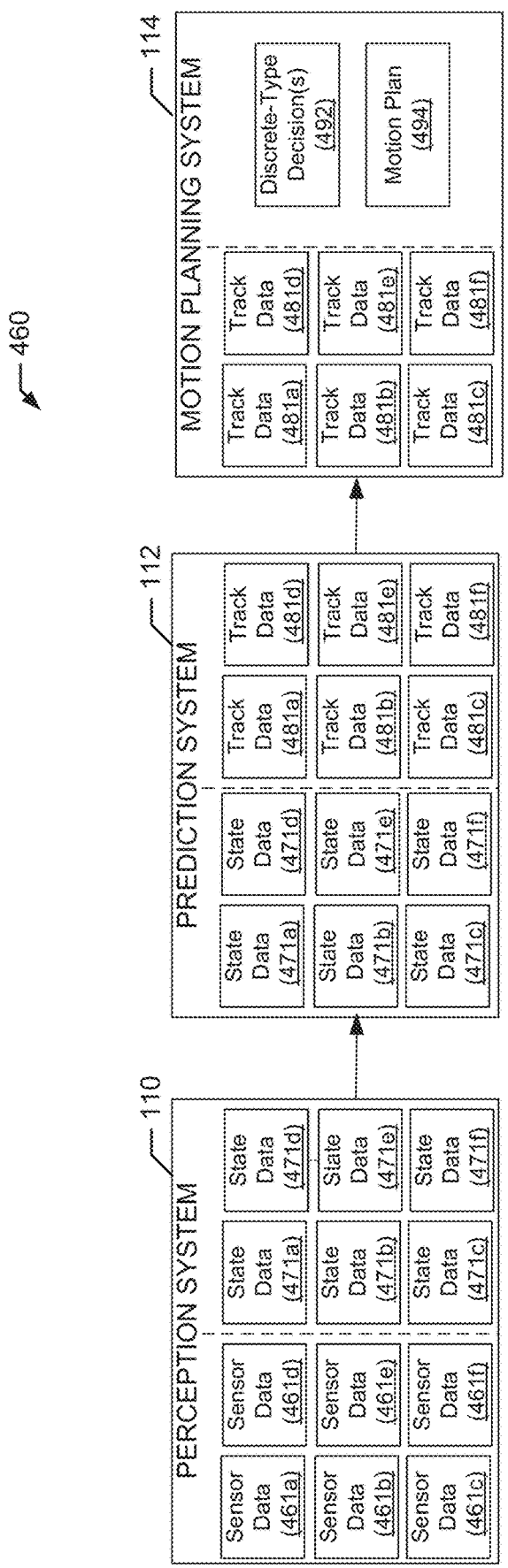
FIG. 4B depicts a block diagram of an example streaming processing configuration according to example aspects of the present disclosure.

FIG. 4B depicts a block diagram of an example streaming processing configuration according to example aspects of the present disclosure. FIG. 4B depicts example systems within an autonomy computing system 460 (e.g., autonomy computing system 106 of FIG. 1), such as perception system 110, prediction system 112, and motion planning system 114. In general, latency can be reduced within the autonomy system 460 by making sure that for each of the perception system 110, prediction system 112, and motion planning system 114, inputs start processing as soon as they come in and outputs are published to other systems as soon as they are ready.

Referring more particularly to perception system 110 of FIG. 4B, perception system 110 can be configured to receive respective subsets of sensor data at one or more cycle(s) transferred from a sensor system (e.g., sensor system 102 of FIG. 1) and/or a memory device (e.g., memory device 130 of FIG. 1). For example, perception system 110 is depicted in FIG. 4B as receiving respective portions of sensor data 461a-461f. The portions of sensor data 461a-461f do not necessarily need to be received at the same time. Instead of receiving a batch of all portions of sensor data 461a-461f, in some implementations, each portion of sensor data 461a-471f is received by perception system 110 in successive increments as it is obtained by one or more sensors and/or as a predetermined subset of a sensor data is obtained. Still further, perception system 110 can be configured to analyze the sensor data 461a-461f received from the sensor system and/or the map data and can identify one or more objects that are proximate to the autonomous vehicle at each time frame. As an example, in some implementations, the perception system can segment the sensor data (e.g., the LIDAR data) into discrete object polygons and/or track objects frame-to-frame (e.g., iteratively over a number of consecutive time frames or periods).

Perception system 110 can also be configured to generate, for each of a plurality of consecutive time frames, state data descriptive of at least a current state of each of a plurality of objects that are perceived within the sensor data. More particularly, portions of state data 471a-471f are depicted within perception system 110 as corresponding to state data for each of a plurality of objects perceived within the portions of sensor data 461a-461f. In particular, in some implementations, the perception system 110 can generate, for each object, a portion of state data 461a-461f that describes a current state of such object (also referred to as one or more features of the object). As examples, the state data for each object can describe an estimate of the object's: location (also referred to as position); speed (also referred to as velocity); acceleration; heading; yaw rate; orientation; size/footprint (e.g., as represented by a bounding polygon or other shape); type/class (e.g., vehicle, pedestrian, bicycle); distance from the autonomous vehicle; minimum path to interaction with the autonomous vehicle; a minimum time duration to interaction with the autonomous vehicle; and/or other state information and/or covariances of the above-described forms of state information. In some implementations, certain state data for an object can be used to determine one or more other features for the object. For example, in some implementations, an object's position, speed, acceleration, and/or heading can be used to determine a minimum path to interaction with the autonomous vehicle or a minimum time duration to interaction with the autonomous vehicle. The perception system 110 can provide the respective portions of state data 471a-471f to the priority classification system (e.g., priority classification system 142 of FIG. 1) and/or the prediction system 112 (e.g., iteratively for each time frame).

Still further, in some implementations, a perception system 110 can be configured to obtain a first portion of autonomy data descriptive of an update for a first feature (e.g., first portion of sensor data 461a) for a first object detected within a surrounding environment of an autonomous vehicle. The perception system 110 can determine (e.g., by coordination with interaction classification system 144 of FIG. 1) a second object to have an interaction classification relative to the first object, the interaction classification being indicative of one or more predetermined types of interaction between objects. In some implementations, the interaction classification is indicative that the first object and the second object are likely to collide (and/or otherwise interact) given their current trajectories. In some implementations, the interaction classification is indicative of the first object and the second object being within a predetermined level of proximity to one another at one or more of a current time or future time. In some implementations, determining the interaction classification between first object and the second object can include accessing a dependence graph that identifies interacting objects. The interaction classification can help the perception system 110 determine when it is appropriate to determine updated state data for an object based on asynchronously received updates for that object and/or other objects and/or regions of interest.

Still further, if autonomy data descriptive of an update for a first feature (e.g., sensor data) for a second object (e.g., corresponding to second portion of sensor data 461b) is not received by perception system 110, an expected time estimate for receiving such autonomy data (e.g., second portion of sensor data 461b) can be determined. When the expected time estimate is less than a threshold value, the perception system 110 can wait for the second portion of sensor data 461b before determining updated state data for the first and second objects (e.g., portions of state data 471a and 471b) based at least in part on the received sensor data for the first and second objects (e.g., portions of sensor data 461a and 461b). When the expected time estimate is greater than a threshold value, or if the perception system 110 waits for receipt of the second portion of sensor data 461b for the second object and doesn't receive it within the expected time estimate (e.g., because the second object is currently occluded), then second portion of sensor data 461b for the second object can be predicted. The perception system 110 can then be configured to determine state data for the first and second objects (e.g., 471a and 471b) based at least in part on the received sensor data for the first object (e.g., 461a). In some implementations, the perception system 110 can also be configured to coordinate transmission of portions of state data 471a-471f to a second system of the autonomy computing system (e.g., a prediction system 112).

In some implementations, the perception system 110 can also be configured to determine a priority classification associated with one or more aspects of a scene (e.g., an object and/or region of interest). Transmission of updated portions of state data 471a-471f from the perception system 110 to another system (e.g., a prediction system 112) can be coordinated at least in part based on the priority classification(s). In one example, determining a priority classification for each object in a plurality of objects can include classifying each object as either high-priority or low-priority. In another example, determining a priority classification for each object in a plurality of objects can include determining a priority classification value from within a predetermined range of values. In some implementations, an order can be determined in which the perception system 110 determines the respective portions of state data 471a-471f for the plurality of objects based at least in part on the priority classification for each object. The respective portions of state data 471a-471f can then be determined according to the order. Transmission of the portions of state data 471a-471f can be controlled in an asynchronous fashion from the perception system 110 to a prediction system 112 or other system of an autonomy computing system.

Referring more particularly to prediction system 112 of FIG. 4B, prediction system 112 can be configured to receive asynchronous updates of state data 471a-471f for each object and to generate, for each of a plurality of consecutive time frames, a predicted future state/track for each object. Different tracks generated by prediction system 112 are represented in FIG. 4B as tracks 481a-481b. For example, various prediction techniques can be used to predict the one or more future locations (e.g., tracks 481a-481f) for the object(s) identified by the perception system 110. The prediction system 112 can provide the predicted future locations of the objects to the motion planning system 114.

In some implementations, the prediction system 112 can be a goal-oriented prediction system that generates one or more potential goals, selects one or more of the most likely potential goals, and develops one or more trajectories by which the object can achieve the one or more selected goals. For example, the prediction system 112 can include a scenario generation system that generates and/or scores the one or more goals for an object and a scenario development system that determines the one or more trajectories by which the object can achieve the goals. In some implementations, the prediction system can include a machine-learned goal-scoring model, a machine-learned trajectory development model, and/or other machine-learned models.

More particularly, prediction system 112 can be configured to obtain a first portion of autonomy data descriptive of an update for a first feature (e.g., first portion of state data 471a) for a first object detected within a surrounding environment of an autonomous vehicle. The prediction system 112 can determine (e.g., by coordination with interaction classification system 144 of FIG. 1) a second object to have an interaction classification relative to the first object, the interaction classification being indicative of one or more predetermined types of interaction between objects. In some implementations, the interaction classification is indicative that the first object and the second object are likely to collide given their current trajectories. In some implementations, the interaction classification is indicative of the first object and the second object being within a predetermined level of proximity to one another at one or more of a current time or future time. In some implementations, determining the interaction classification between first object and the second object can include accessing an object dependence graph that identifies interacting objects. The interaction classification can help the prediction system 112 determine when it is appropriate to determine updated track data for an object based on asynchronously received updates for that object and/or other objects and/or regions of interest.

More particularly, if autonomy data associated with a first aspect (e.g., state data) of a second object (e.g., second portion of state data 471b) has not yet been received by the prediction system 112, an expected time estimate for receiving such autonomy data can be determined. When the expected time estimate is less than a threshold value, the prediction system 112 can wait for such data before determining updated track data for the first and second objects (e.g., track data 481a and 481b) based at least in part on the received state data for the first and second objects (e.g., state data 471a and 471b). When the expected time estimate is greater than a threshold value, or if the prediction system 112 waits for receipt of the state data for the second object (e.g., 471b) and doesn't receive it within the expected time estimate (e.g., because the second object is currently occluded), then state data for the second object (e.g., 471b) can be predicted. The system can then be configured to determine track data for the first and second objects (e.g., 481a, 481b) based at least in part on the received state data for the first object (e.g., 471a). In some implementations, the prediction system 112 can also be configured to coordinate transmission of portions of track data 481a-481f to a second system of the autonomy computing system (e.g., a motion planning system 114).

In some implementations, the prediction system 112 can also be configured to determine a priority classification associated with one or more aspects of a scene (e.g., an object and/or region of interest). Transmission of updated portions of track data 481a-481f from the prediction system 112 to another system (e.g., a motion planning system 114) can be coordinated at least in part based on the priority classification(s). In one example, determining a priority classification for each object in a plurality of objects can include classifying each object as either high-priority or low-priority. In another example, determining a priority classification for each object in a plurality of objects can include determining a priority classification value from within a predetermined range of values. In some implementations, an order can be determined in which the prediction system 112 determines track data 481a-481f for the plurality of objects based at least in part on the priority classification for each object. The track data 481a-481f can then be determined according to the order. Transmission of the track data 481a-481f can be controlled in an asynchronous fashion from the prediction system 112 to a motion planning system 114 or other system of an autonomy computing system.

Referring more particularly to motion planning system 114 of FIG. 4B, motion planning system 114 can be configured to receive asynchronous updates of track data 481a-481f for each object. Motion planning system 114 can determine a motion plan for the autonomous vehicle based at least in part on the state data 471a-471f provided by the perception system 110 and/or the predicted one or more future locations or tracks 481a-481f for the objects provided by the prediction system 112. Stated differently, given information about the current locations of proximate objects and/or predictions about the future locations of proximate objects, the motion planning system 114 can determine a motion plan for the autonomous vehicle that best navigates the vehicle relative to the objects at their current and/or future locations.

In accordance with one aspect of the present disclosure, motion planning system 114 can be configured to receive autonomy data descriptive of an update for a first aspect of a scene of an environment surrounding the autonomous vehicle. In some implementations, the first aspect of the scene of the environment surrounding the autonomous vehicle includes a region of interest within the scene. In some implementations, the first aspect of the scene of the environment surrounding the autonomous vehicle includes an object perceived within the scene. For instance, autonomy data updates received for a first aspect of a scene can correspond to track updates 481a-481f received from prediction system 112.

In some implementations, the motion planning system 114 can be configured to determine a priority classification for the first aspect of the scene (e.g., first portion of track data 481a) of the environment surrounding the autonomous vehicle. For example, in some implementations, determining a priority classification for the first aspect of the scene (e.g., portion of track data 481a) of the environment surrounding the autonomous vehicle can include determining a level of influence of the first aspect of the scene of the environment on a recently obtained motion plan for the autonomous vehicle.

In some implementations, the computing system can be additionally or alternatively configured to determine an interaction classification for the first aspect of the scene (e.g., first portion of track data 481a) relative to other aspects of the scene (e.g., portions of track data 481b-481f) of the environment surrounding the autonomous vehicle. For example, determining an interaction classification can involve accessing a dependence graph that identifies interacting aspects.

When one or more of the priority classification and the interaction classification for the first aspect is determined to meet one or more predetermined criteria, one or more discrete-type decisions 492 relative to navigation of the autonomous vehicle can be determined and/or an optimized motion plan 494 for the autonomous vehicle that is configured to control navigation of the autonomous vehicle in keeping with the discrete-type decision(s) 492 and that optimizes one or more cost functions can be determined.

Thus, in some implementations, the motion planning system 114 can include one or more scenario controllers that make discrete-type decisions 492 regarding control of the autonomous vehicle according to different driving scenarios. As one example, the scenario controllers can include a yield controller that controls whether the autonomous vehicle yields to certain objects in the surrounding environment. Other example scenario controllers can include a pass, ignore, queue controller; a route selection/lane change controller; a speed regressor; and/or other controllers that make discrete-type decisions about how the autonomous vehicle should behave. In some implementations, the scenario controllers can make high-level decisions that correspond to or otherwise mimic human-level understanding and decision making about the surrounding environment (e.g., whether to yield to a particular object or not yield to a particular object). Once such discrete-type decisions have been made, a trajectory generator can generate a motion plan 494 (e.g., through local optimization over a set of appropriate cost functions) that executes or otherwise complies with the decisions 492 made by the scenario controller(s).

In some implementations, the motion planning system 114 can be configured to determine a set of one or more discrete-type decisions from a plurality of discrete-type decisions 492, the set of one or more discrete-type decisions corresponding to those discrete-type decisions 492 that are based at least in part on the first aspect of the scene of the environment surrounding the autonomous vehicle. In this manner, when an update is received for the first aspect (e.g., an object or region of interest), only those discrete-type decisions that depend on the first aspect are updated, thus reducing latency and processing requirements by the motion planning system.

In some implementations, the computing system can be further configured to update a priority classification for the first aspect of the scene of the environment in a different system (e.g., a perception system 110 and/or prediction system 112) other than the motion planning system 114. In this manner, when new aspects (e.g., objects and/or regions of interest) are determined by a motion planning system 114 to have a higher priority, such priority classifications can be shared with other systems so that sensor data, state data and/or track data associated with the higher priority aspects can be received and processed more quickly by the motion planning system in future time frames.

Although FIGS. 4A and 4B illustrate a fixed number of data portions and/or objects within various systems and/or data frames of an autonomy computing system, it should be appreciated that this is not a limiting aspect of the disclosed technology. The disclosed principles can be applied to greater or fewer data portions and/or or objects within each system and/or data frame.

Referring now to FIG. 5, a block diagram of an example computing system 100 according to example embodiments of the present disclosure is depicted. Elements that are the same or similar to those in FIG. 1 are referred to with the same reference numerals. As shown, the example computing system 100 can include a computing system 150 (e.g., an autonomy computing system 106 on an autonomous vehicle 10) and a machine learning computing system 180 that are communicatively coupled over one or more communication networks 170.

The computing system 150 can include one or more processor(s) 152 and memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage media, such as RAM, ROM, EEPROM, EPROM, one or more memory devices, flash memory devices, etc., and combinations thereof.

The memory 154 can store information that can be accessed by the one or more processors 152. For instance, the memory 154 (e.g., one or more non-transitory computer-readable storage mediums, memory devices) can store data 156 that can be obtained, received, accessed, written, manipulated, created, and/or stored. The memory 154 can also store computer-readable instructions 158 that can be executed by the one or more processors 152. The instructions can be software written in any suitable programming language or can be implemented in hardware. Additionally, or alternatively, the instructions can be executed in logically and/or virtually separate threads on processor(s) 152. For example, the memory 154 can store instructions that when executed by the one or more processors 152 cause the one or more processors 152 to perform any of the operations and/or functions described herein.

The computing system 150 can also include a network interface 160 used to communicate with one or more systems or devices, including systems or devices that are remotely located from the computing system 150. The network interface 160 can include any circuits, components, software, etc. for communicating with one or more networks (e.g., 170). In some implementations, the network interface 160 can include, for example, one or more of a communications controller, receiver, transceiver, transmitter, port, conductors, software and/or hardware for communicating data.

The computing system 150 can also include a perception system 110, a prediction system 112, a motion planning system 114, a vehicle controller 116, and a data streaming controller 140, as described herein. Each of the perception system 110, prediction system 112, motion planning system 114, vehicle controller 116, and data streaming controller 140 can include computer logic utilized to provide desired functionality. In some implementations, each of the perception system 110, the prediction system 112, the motion planning system 114, the vehicle controller 116, and the data streaming controller 140 can be implemented in hardware, firmware, and/or software controlling a general purpose processor. For example, in some implementations, each of the perception system 110, the prediction system 112, the motion planning system 114, the vehicle controller 116, and the data streaming controller 140 can include program files stored on a storage device, loaded into a memory and executed by one or more processors. In other implementations, each of the perception system 110, the prediction system 112, the motion planning system 114, the vehicle controller 116, and the data streaming controller 140 can include one or more sets of computer-executable instructions that are stored in a tangible computer-readable storage medium such as RAM hard disk or optical or magnetic media.

According to another example aspect of the present disclosure, the data streaming controller 140 can store or include one or more machine-learned models 148. For example, the machine-learned model 148 can be or can otherwise include various machine-learned models such as decision tree-based models, support vector machines, k-Nearest Neighbor models, neural networks (e.g., deep neural networks), or other multi-layer non-linear models.

Example neural networks include feed-forward neural networks, recurrent neural networks (e.g., long short-term memory recurrent neural networks), or other forms of neural networks.

In some implementations, the one or more machine-learned models 148 can include one or more classifiers that assist in classifying each object perceived by the autonomous vehicle and/or region of interest within a scene of a surrounding environment of an autonomous vehicle. For example, in some implementations, the machine-learned model(s) 148 can include a machine-learned object classifier configured to classify each perceived object, such as by classifying each object as high-priority or low-priority. As another example, in some implementations, the machine-learned model(s) 148 can include a machine-learned object classifier configured to classify each perceived object, such as having one or more predetermined categories of interaction relative to one or more other objects.

In some implementations, the computing system 150 can determine a priority classification for each object and/or region of interest using the machine-learned model(s) 148. For example, the computing system 150 can obtain data descriptive of the machine-learned model, input one or more features associated with each object or region of interest into the machine-learned model, and receive data indicative of a respective priority classification for each object and/or region of interest as output of the machine-learned model.

In some implementations, the computing system 150 can determine an interaction classification for selected objects and/or regions of interest using the machine-learned model(s) 148. For example, the computing system 150 can obtain data descriptive of the machine-learned model, input one or more features associated with each object or region of interest into the machine-learned model, and receive data indicative of a respective interaction classification for each object and/or region of interest as output of the machine-learned model.

In some implementations, the computing system 1050 can receive the one or more machine-learned models 148 from the machine learning computing system 180 over network 170 and can store the one or more machine-learned models 148 in the memory 154. The computing system 150 can then use or otherwise implement the one or more machine-learned models 148 (e.g., by processor(s) 152).

In some implementations, certain operations described herein can be performed by a machine learning computing system 180 that is remotely located to the computing system 150 and in communication with the computing system 150 over one or more wireless networks 170 (e.g., cellular data networks, satellite communication networks, wide area networks, etc.). As an example, the machine learning computing system 180 can include one or more server computing devices. In the event that plural server computing devices are used, the server computing devices can be arranged according to a parallel computing architecture, a sequential computing architecture, or combinations thereof.

The machine learning computing system 180 can include one or more processors 182 and a memory 184. The one or more processors 182 can be any suitable processing device (e.g., a processor core, a microprocessor, an ASIC, a FPGA, a controller, a microcontroller, etc.) and can be one processor or a plurality of processors that are operatively connected. The memory 184 can include one or more non-transitory computer-readable storage media, such as RAM, ROM, EEPROM, EPROM, one or more memory devices, flash memory devices, etc., and combinations thereof.

The memory 184 can store information that can be accessed by the one or more processors 182. For instance, the memory 184 (e.g., one or more non-transitory computer-readable storage mediums, memory devices) can store data 185 that can be obtained, received, accessed, written, manipulated, created, and/or stored. In some implementations, the machine learning computing system 180 can obtain data from one or more memory device(s) that are remote from the machine learning computing system 180.

The memory 184 can also store computer-readable instructions 186 that can be executed by the one or more processors 182. The instructions 186 can be software written in any suitable programming language or can be implemented in hardware. Additionally, or alternatively, the instructions 186 can be executed in logically and/or virtually separate threads on processor(s) 182. For example, the memory 184 can store instructions 186 that when executed by the one or more processors 182 cause the one or more processors 182 to perform any of the operations and/or functions described herein.

The machine learning computing system 180 can also include a network interface 183 used to communicate with one or more systems or devices, including systems or devices that are remotely located from the machine learning computing system 180. The network interface 183 can include any circuits, components, software, etc. for communicating with one or more networks (e.g., 170). In some implementations, the network interface 183 can include, for example, one or more of a communications controller, receiver, transceiver, transmitter, port, conductors, software and/or hardware for communicating data.

In some implementations, the machine learning computing system 180 includes one or more server computing devices. If the machine learning computing system 180 includes multiple server computing devices, such server computing devices can operate according to various computing architectures, including, for example, sequential computing architectures, parallel computing architectures, or some combination thereof.

In addition or alternatively to the machine-learned model(s) 148 at the computing system 150, the machine learning computing system 180 can include one or more machine-learned models 188. For example, the machine-learned model(s) 188 can be or can otherwise include various machine-learned models such as decision tree-based models, support vector machines, k-Nearest Neighbor models, neural networks (e.g., deep neural networks), or other multi-layer non-linear models. Example neural networks include feed-forward neural networks, recurrent neural networks (e.g., long short-term memory recurrent neural networks), or other forms of neural networks.

As an example, the machine learning computing system 180 can communicate with the computing system 150 according to a client-server relationship. For example, the machine learning computing system 180 can implement the machine-learned model(s) 188 to provide a web service to the computing system 150. For example, the web service can provide priority classifications and/or interaction classifications to the computing system 150.

Thus, machine-learned models 148 can be located and used at the computing system 150 and/or machine-learned models 188 can be located and used at the machine learning computing system 180.

In some implementations, the machine learning computing system 180 and/or the computing system 150 can train the machine-learned models 148 and/or 188 through use of a model trainer 190. The model trainer 190 can train the machine-learned models 148 and/or 188 using one or more training or learning algorithms. One example training technique is backwards propagation of errors. In some implementations, the model trainer 190 can perform supervised training techniques using a set of labeled training data 192. In other implementations, the model trainer 190 can perform unsupervised training techniques using a set of unlabeled training data 192. The model trainer 190 can perform a number of generalization techniques to improve the generalization capability of the models being trained. Generalization techniques include weight decays, dropouts, or other techniques.

In particular, the model trainer 190 can train a machine-learned model 148 and/or 188 based on a set of training data 192. The training data 192 can include, for example, vehicle data logs from previously completed autonomous vehicle driving sessions. The vehicle data logs can include, for example, sensor data obtained by the sensor system 102 of the autonomous vehicle, state data descriptive of one or more objects perceived by the perception system 110 of the autonomous vehicle, predicted future states for objects perceived by the autonomous vehicle determined by the prediction system 112, previous motion plans determined by the motion planning system 114, or other vehicle data as described herein. In some implementations, the model trainer 190 can be configured to train the machine-learned models 148 and/or 188 by determining whether objects perceived by the autonomous vehicle and/or particular regions of interest impacted a motion plan of the autonomous vehicle.

According to another aspect of the present disclosure, the training data 192 can also include vehicle data logs that include priority classification labels and/or interaction classification labels manually recorded by a human reviewer and/or automatically applied by predetermined heuristic rules to train the machine-learned model(s) 148 and/or 188.

The model trainer 190 can include computer logic utilized to provide desired functionality, and can be implemented in hardware, firmware, and/or software controlling a general purpose processor. For example, in some implementations, the model trainer 190 includes program files stored on a storage device, loaded into a memory and executed by one or more processors. In other implementations, the model trainer 190 includes one or more sets of computer-executable instructions that are stored in a tangible computer-readable storage medium such as RAM hard disk or optical or magnetic media.

The network(s) 170 can be any type of network or combination of networks that allows for communication between devices. In some embodiments, the network(s) 170 can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 5 illustrates one example computing system 100 that can be used to implement the present disclosure. Other computing systems can be used as well. For example, in some implementations, the computing system 150 can include the model trainer 190 and the training dataset 192. In such implementations, the machine-learned models 148 can be both trained and used locally at the computing system 150. As another example, in some implementations, the computing system 150 is not connected to other computing systems.

In addition, components illustrated and/or discussed as being included in one of the computing systems 150 or 180 can instead be included in another of the computing systems 150 or 180. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 6:
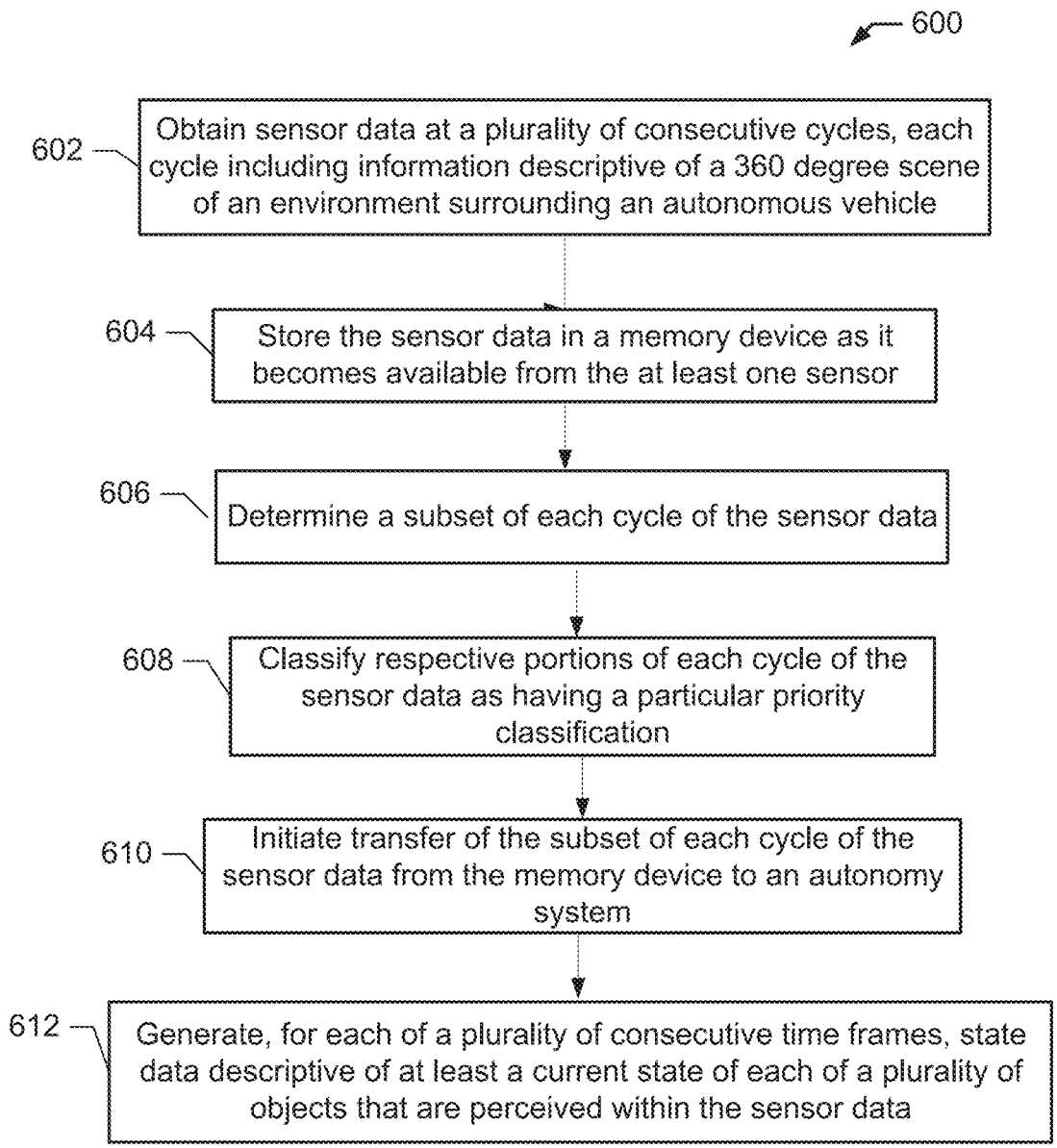
FIG. 6 depicts a flow chart diagram of a first example method according to example aspects of the present disclosure.

Referring now to FIG. 6, a first example method (600) according to example aspects of the present disclosure is depicted. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure. The method (600) can be implemented by a computing system, such as a computing system comprising one or more computing devices.

At (602), the method (600) can include obtaining, by a computing system, sensor data at a plurality of consecutive cycles. The sensor data at each cycle can include information descriptive of a 360-degree scene of an environment surrounding an autonomous vehicle. In some implementations, the sensor data is obtained via a sensor system including at least one sensor, such as one or more cameras, one or more Light Detection and Ranging (LIDAR) system sensors, or one or more Radio Detection and Ranging (RADAR) system sensors.

At (604), the method (600) can include storing, by the computing system, the sensor data in a memory device as it becomes available from the at least one sensor. In some implementations, the memory device comprises to which data is stored at (604) corresponds to a rolling buffer to which sensor data is written at a plurality of successive increments of the sensor data within each cycle of the sensor data. In some implementations, each successive increment of the sensor data within a cycle of the sensor data comprises an angular slice of the 360 degree scene of an environment surrounding an autonomous vehicle.

At (606), the method (600) can include determining, by the computing system, a subset of the sensor data at each cycle. In some implementations, determining a subset of the sensor data at each cycle at (606) can include determining, by the computing system, at least one high-priority region of interest based on an expected location of an object within a second cycle of the sensor data. The expected location of the object can be determined by analyzing a first cycle of the sensor data, wherein the second cycle of the sensor data is obtained subsequently to the first cycle of the sensor data.

At (610), the method (600) can include initiating transfer, by the computing system, of the subset of the sensor data at each cycle from the memory device to an autonomy system associated with the computing system in response to the entire subset being stored in the memory device. In some implementations, initiating transfer at (610) of the subset of the sensor data at each cycle of the sensor data from the memory device to an autonomy system associated with the computing system comprises initiating transfer of each successive increment of the sensor data within each cycle as soon as it is written to the rolling buffer.

At (608), method (600) can include classifying, by the computing system, respective portions of the sensor data at each cycle as having a particular priority classification. In some implementations, classifying respective portions of the sensor data at each cycle at (608) can be implemented by a priority classification system as described herein. In some implementations, classifying at (608) can include classifying one or more aspects (e.g., objects and/or regions of interest) within the sensor data obtained at (602). For example, aspects can be classified as either high-priority or low-priority based on the respective feature data for each aspect. In another example, aspects can be classified into one of a plurality of priority categories and/or rankings relative to other aspects (e.g., for Y aspects, determine a rank of 1 to Y). The relative priority classification and/or rank for each aspect can be determined based on the feature data for each aspect. The priority classification for each aspect can be indicative of an importance of the aspect to a determination for a motion plan for the autonomous vehicle.

More particularly, in some implementations, classifying at (608) can include determining at least one high-priority region of interest based on an expected location of an object within a second cycle of the sensor data. The expected location of the object can be determined by analyzing a first cycle of the sensor data, wherein the second cycle of the sensor data is obtained subsequently to the first cycle of the sensor data. In some implementations, at least one high-priority region of interest can also be determined for a third cycle of the sensor data, wherein the at least one high-priority region of interest for the second cycle of the sensor data at least partially overlaps the at least one high-priority region of interest for the third cycle of the sensor data.

In some implementations, the at least one high-priority region of interest includes an angular slice of the 360 degree scene of an environment surrounding an autonomous vehicle, the angular slice being inclusive of the object. In some implementations, the at least one high-priority region of interest is determined based on a predicted future location of the autonomous vehicle as specified by a motion plan determined at least in part from the sensor data.

When method (600) includes step (608), initiating transfer at (610) of the subset of the sensor data at each cycle of the sensor data from the memory device to an autonomy system associated with the computing system is based at least in part on the particular priority classification for the respective portions of each cycle as determined at (608).

At (612), method (600) can include generating, by the computing system, for each of a plurality of consecutive time frames, state data descriptive of at least a current state of each of a plurality of objects that are perceived within the sensor data. In some implementations, generating stat data at (612) can be implemented by a perception system as described herein.

Figure 7:
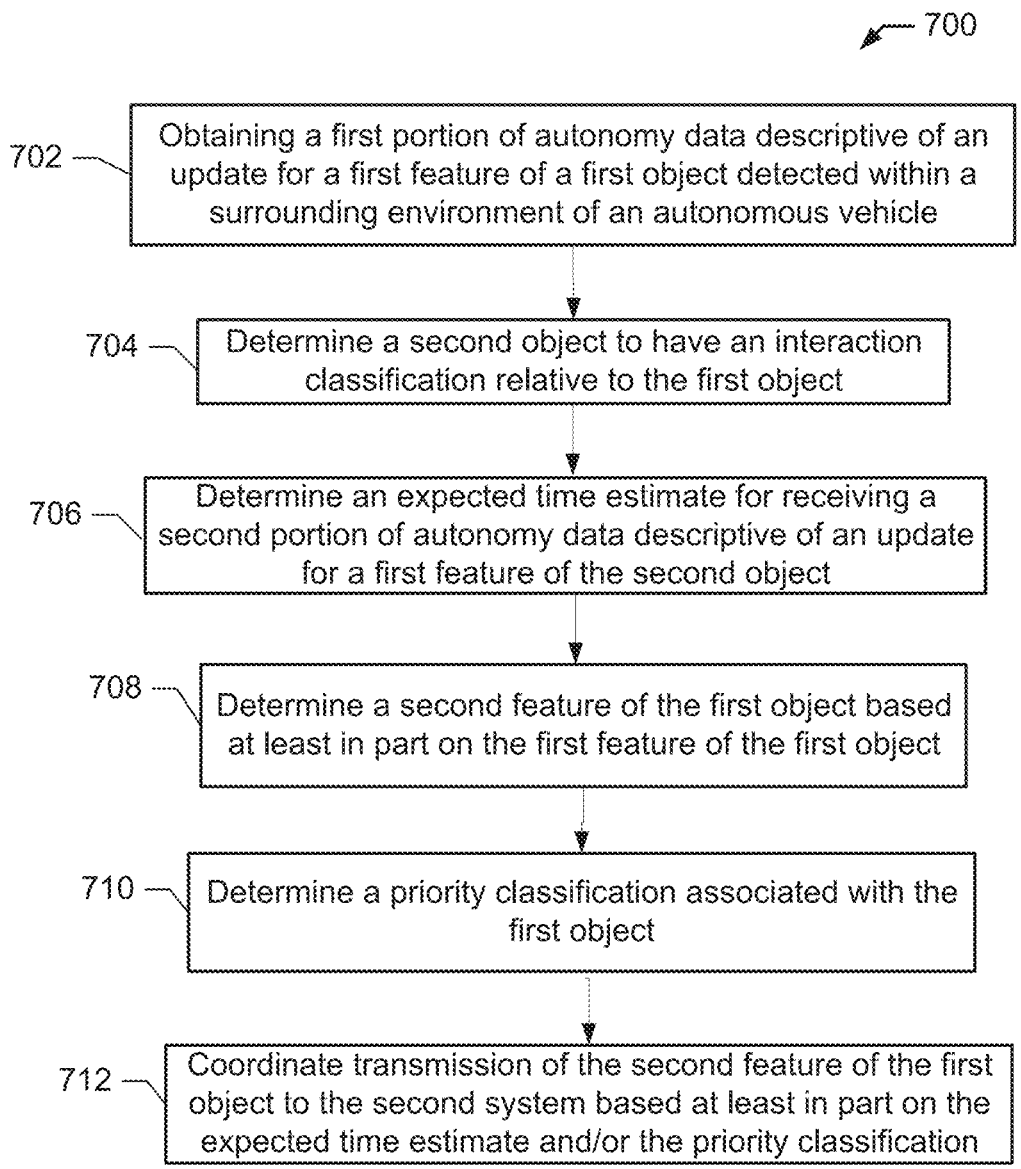
FIG. 7 depicts a flow chart diagram of a second example method according to example aspects of the present disclosure.

Referring now to FIG. 7, a second example method (700) according to example aspects of the present disclosure is depicted. Although FIG. 7 depicts steps performed in a particular order for purposes of illustration and discussion, the methods of the present disclosure are not limited to the particularly illustrated order or arrangement. The various steps of method (700) can be omitted, rearranged, combined, and/or adapted in various ways without deviating from the scope of the present disclosure. The method (700) can be implemented by a computing system, such as a computing system comprising one or more computing devices.

At (702), the method (700) can include obtaining a first portion of autonomy data descriptive of an update for a first feature of a first object detected within a surrounding environment of an autonomous vehicle. In some implementations, obtaining a first portion of autonomy data at (702) can be implemented by a first system of an autonomy computing system.

At (704), the method (700) can include determining that a second object has an interaction dependence relative to the first object. In some implementations, determining that the second object has an interaction dependence relative to the first object at (704) can correspond to determining that the first object and the second object are likely to interact given their current trajectories. In some implementations, determining that the second object has an interaction dependence relative to the first object at (704) can correspond to determining that the first object and the second object are within a predetermined level of proximity to one another at one or more of a current time or a future time. In some implementations, determining that a second object has an interaction dependence relative to the first object at (704) includes accessing an object dependence graph that identifies interacting objects based on determined interaction classifications for the objects. In some implementations, determining that a second object has an interaction classification relative to the first object at (704) can include determining an interaction classification for the first object using a machine-learned model that has been trained based at least in part on training data that comprises annotated vehicle data logs that were previously collected during previous autonomous vehicle driving sessions.

At (706), the method (700) can include determining an expected time estimate for receipt by the first system of a second portion of autonomy data descriptive of an update for a first feature of the second object.

At (708), the method (700) can include determining a second feature of the first object based at least in part on the first feature of the first object.

At (710), the method (700) can include determining a priority classification associated with the first object. When method (700) includes determining a priority classification at (710), coordinating transmission of the second feature of the first object to a second system at (712) can be further based at least in part on the priority classification determined at (710). In some implementations, determining a priority classification for each object in the plurality of objects at (710) can include classifying each object as either high-priority or low-priority.

At (712), the method (700) can include coordinating transmission of the second feature of the first object to a second system of the autonomy computing system based at least in part on the expected time estimate determined at (706).

In some implementations, the first system that obtains autonomy data at (702) can be a perception system configured to generate state data descriptive of at least a current state of each of a plurality of objects that are perceived by the autonomous vehicle. In such example, the first feature can be sensor data associated with an object, and the second feature determined at (708) can be state data for the object determined at least in part from the sensor data associated with the object. In addition, the second system to which transmission is coordinated at (712) can be a prediction system configured to determine, for a current time frame, a predicted track for each of the plurality of objects including the first object and the second object.

In some implementations, the first system that obtains autonomy data at (702) can be a prediction system configured to determine a predicted track for each of a plurality of objects that are perceived by the autonomous vehicle. In such example, the first feature can be current state data associated with an object of the plurality of objects, and the second feature determined at (708) can be predicted future track data for the object determined at least in part from the current state data associated with the object. In addition, the second system to which transmission is coordinated at (712) can be a motion planning system configured to determine, for a current time frame, a motion plan for the autonomous vehicle based at least in part on track data for the first object and the second object.

In some implementations, determining an expected time estimate at (706) can include determining that an expected time estimate is less than a threshold value. In response to determining that the expected time estimate is less than a threshold value, coordinating transmission at (712) of the second feature of the first object to the second system of the autonomy computing system based at least in part on the expected time estimate can include more particular aspects. For example, coordinating transmission at (712) in such examples can include obtaining by the first system a second portion of autonomy data descriptive of an update for the first feature of the second object. A second feature of the second object can be determined based at least in part on the first feature of the second object (and also the first feature of the first object if applicable). The second feature of the first object and the second feature of the second object can then be transmitted from the first system to the second system.

In some implementations, determining an expected time estimate at (706) can include determining that an expected time estimate is greater than a threshold value. In response to determining that the expected time estimate is greater than a threshold value, coordinating transmission at (712) of the second feature of the first object to the second system of the autonomy computing system based at least in part on the expected time estimate can include more particular aspects. For example, coordinating transmission at (712) in such examples can include determining, by the first system, a predicted second feature of the second object based at least in part on the first feature of the first object. The second feature of the first object and the predicted second feature of the second object can be provided from the first system to the second system.

In some implementations, method (700) can include additional and/or alternative operations. For example, method (700) can include obtaining, by the first system, autonomy data descriptive of updates for a first feature of a plurality of objects detected within a surrounding environment of an autonomous vehicle. Method (700) can also include determining a priority classification for each object in the plurality of objects based at least in part on the respective updates for the first feature of each object. Method (700) can also include determining an order in which the computing system determines a second feature for each object based at least in part on the priority classification for each object. Method (700) can also include determining the second feature for each object based at least in part on the determined order.

Figure 8:
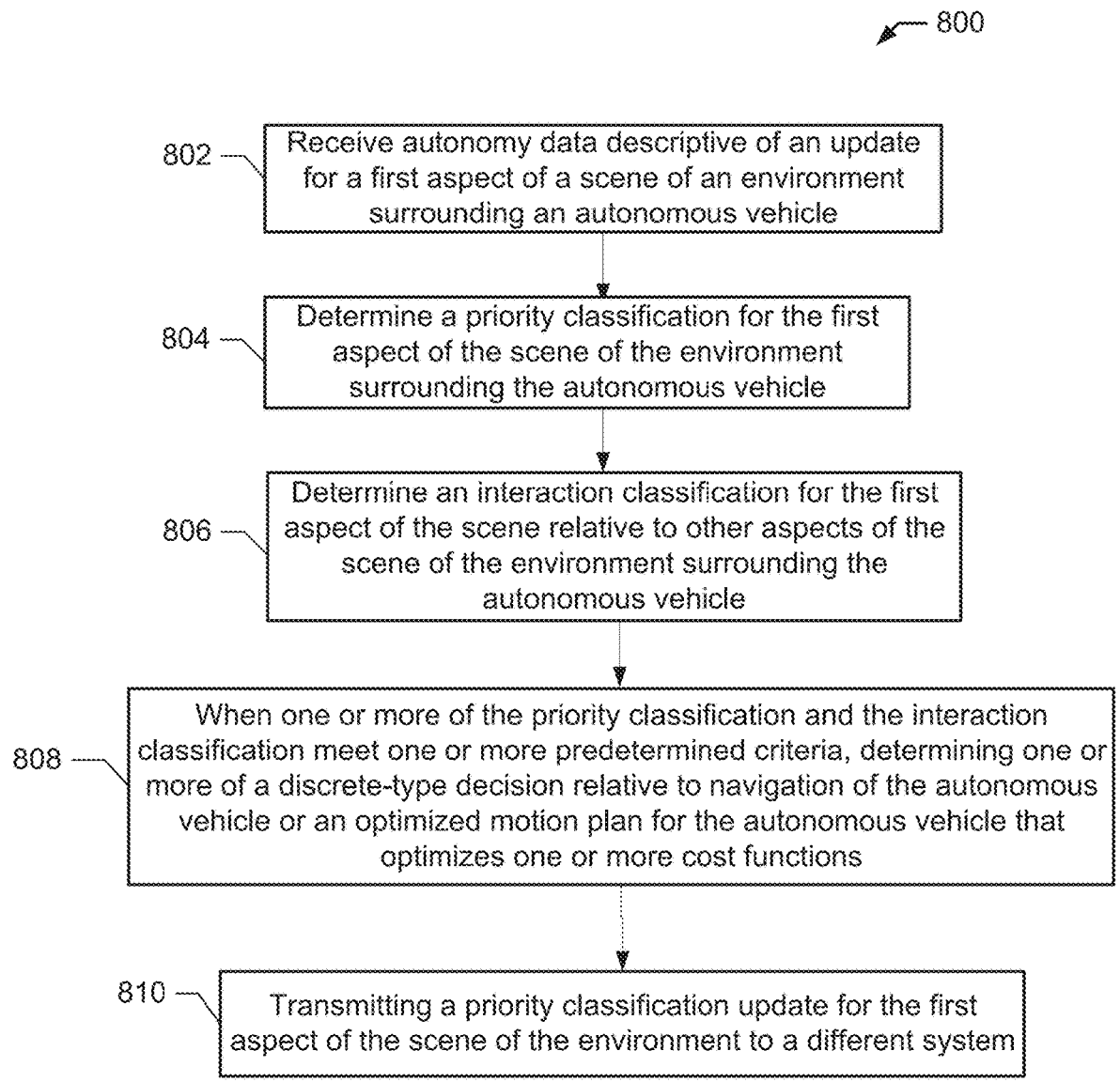
FIG. 8 depicts a flow chart diagram of a third example method according to example aspects of the present disclosure.

Referring now to FIG. 8, a third example method (800) according to example aspects of the present disclosure is depicted. Although FIG. 8 depicts steps performed in a particular order for purposes of illustration and discussion, the methods of the present disclosure are not limited to the particularly illustrated order or arrangement. The various steps of method (800) can be omitted, rearranged, combined, and/or adapted in various ways without deviating from the scope of the present disclosure. The method (800) can be implemented by a computing system, such as a computing system comprising one or more computing devices. In some implementations, the method (800) can be implemented by a motion planning system comprising one or more computing devices.

At (802), the method (800) can include receiving autonomy data descriptive of an update for a first aspect of a scene of an environment surrounding the autonomous vehicle. In some implementations, the first aspect of the scene of the environment surrounding the autonomous vehicle includes one or more of a region of interest within the scene or an object perceived within the scene. In some implementations, receiving the autonomy data at (802) descriptive of the update for the first aspect of the scene of the environment surrounding the autonomous vehicle corresponds to receiving the autonomy data from one or more of a perception system or a prediction system.

At (804), the method (800) can include determining a priority classification for the first aspect of the scene of the environment surrounding the autonomous vehicle. In some implementations, determining a priority classification for the first aspect of the scene of the environment surrounding the autonomous vehicle includes determining a level of influence of the first aspect of the scene of the environment on a recently obtained motion plan for the autonomous vehicle.

At (806), the method (800) can include determining an interaction classification for the first aspect of the scene relative to other aspects of the scene of the environment surrounding the autonomous vehicle.

At (808), method (800) can include determining that one or more of the priority classification and the interaction classification for the first aspect meets one or more predetermined criteria. In response to such determination, the method (800) can include determining one or more of a discrete-type decision relative to navigation of the autonomous vehicle or an optimized motion plan for the autonomous vehicle that is configured to control navigation of the autonomous vehicle in keeping with the discrete-type decision and that optimizes one or more cost functions. In some implementations, determining one or more of a discrete-type decision includes determining a set of one or more discrete-type decisions from a plurality of discrete-type decisions, the set of one or more discrete-type decisions corresponding to those discrete-type decisions that are based at least in part on the first aspect of the scene of the environment surrounding the autonomous vehicle.

At (810), the method (800) can include transmitting a priority classification update for the first aspect of the scene of the environment to a different system other than the motion planning system (e.g., to a sensor system, a perception system, and/or a prediction system). In some implementations, based on the transmission of the priority classification update at (810), a different system than the motion planning system can then update a priority classification for the first aspect of the scene of the environment.

In some implementations, method (800) can include additional and/or alternative operations. For example, in some implementations, method (800) can additionally include determining that a second aspect of the scene has an interaction dependence relative to the first aspect of the scene, and receiving autonomy data descriptive of an update for the second aspect of the scene. More particularly, determining that the second aspect of the scene has the interaction dependence relative to the first aspect of the scene can include accessing an object dependence graph that identifies interacting aspects. In some implementations, determining at (808) one or more of the discrete-type decision relative to navigation of the autonomous vehicle or the optimized motion plan for the autonomous vehicle that is configured to control navigation of the autonomous vehicle in keeping with the discrete-type decision and that optimizes the one or more cost functions is based at least in part on the autonomy data descriptive of the update for the first aspect of the scene and the autonomy data descriptive of the update for the second aspect of the scene.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
    a sensor system comprising at least one sensor configured to obtain sensor data at a plurality of consecutive cycles, the sensor data including information descriptive of an environment surrounding an autonomous vehicle;
    a memory device for storing the sensor data as the sensor data becomes available from the at least one sensor; and
    a data streaming controller comprising one or more processors and one or more non-transitory computer-readable media that store instructions that are executable by the one or more processors to cause the data streaming controller to perform operations, the operations comprising:
    for a particular cycle of the plurality of consecutive cycles, classifying a first region within the sensor data as having a first priority level and a second region within the sensor data as having a second priority level, wherein the first priority level is higher than the second priority level, wherein a cycle size associated with the particular cycle corresponds to a 360 degree scene of the environment, and wherein a subset size of the first region corresponds to a portion of the cycle size that is less than 360 degrees;
    initiating transfer of the first region of sensor data, from the memory device to a perception system within the computing system upon relay of the first region of sensor data from the at least one sensor to the memory device and before the entire 360 degree scene of the particular cycle is obtained and relayed from the at least one sensor to the memory device and before initiating transfer of the second region of sensor data from the memory device to the perception system in the particular cycle; and
    a motion planning system that determines a motion plan for controlling motion of the autonomous vehicle based at least in part on the sensor data transferred to the perception system.

2. The computing system of claim 1, wherein:
    the memory device comprises a rolling buffer to which the sensor data is written at a plurality of successive increments of the sensor data within the particular cycle.

3. The computing system of claim 2, wherein initiating transfer of the sensor data from the memory device to the perception system within the computing system comprises initiating transfer of respective successive increments of the sensor data within the particular cycle as soon as the respective successive increments are written to the rolling buffer.

4. The computing system of claim 2, wherein the respective successive increments of the sensor data within the particular cycle comprise an angular slice of a 360 degree scene of the environment surrounding the autonomous vehicle.

5. The computing system of claim 1, wherein the at least one sensor comprises a camera, a Light Detection and Ranging (LIDAR) system sensor, or a Radio Detection and Ranging (RADAR) system sensor.

6. The computing system of claim 1, further comprising a priority classification system comprising one or more processors, wherein the priority classification system is configured to, for the particular cycle, determine the first region within the sensor data to classify as having the first priority level and the second region within the sensor data to classify as having the second priority level.

7. The computing system of claim 6, wherein the first region is determined based on an expected location of an object within a second cycle of the sensor data, the expected location of the object being determined by analyzing a first cycle of the sensor data, wherein the second cycle of the sensor data is obtained subsequently to the first cycle of the sensor data.

8. The computing system of claim 7, wherein the first region comprises an angular slice of a 360 degree scene of the environment surrounding the autonomous vehicle, the angular slice being inclusive of the object.

9. The computing system of claim 6, wherein the first region is determined based on a predicted future location of the autonomous vehicle as determined by the motion planning system.

10. The computing system of claim 7, wherein the priority classification system is further configured to determine a third region within the sensor data to classify as having the first priority level for a third cycle of the sensor data, and wherein the first region within the sensor data for the second cycle at least partially overlaps the third region within the sensor data for the third cycle.

11. The computing system of claim 6, wherein:
    the priority classification system is configured to classify respective portions of the sensor data at the particular cycle as having a particular priority classification; and
    the data streaming controller is configured to initiate transfer of the respective portions of the sensor data at the particular cycle based at least in part on the particular priority classification for the respective portions.

12. The computing system of claim 11, wherein the particular priority classification for the respective portions of the sensor data at the particular cycle comprises either the first priority level or the second priority level.

13. The computing system of claim 1, further comprising a perception system configured to receive the first region of the sensor data at the particular cycle transferred from the memory device and to generate state data descriptive of at least a current state of one or more objects that are perceived within the sensor data.

14. A computer-implemented method, comprising:
obtaining sensor data at a plurality of consecutive cycles, the sensor data including information descriptive of an environment surrounding an autonomous vehicle;
storing the sensor data in a memory device as the sensor data becomes available from at least one sensor;
for a particular cycle of the plurality of consecutive cycles, classifying a first region within the sensor data corresponding to a first priority level and a second region within the sensor data corresponding to a second priority level, wherein the first priority level is higher than the second priority level, wherein a cycle size associated with the particular cycle corresponds to a 360 degree scene of the environment, and wherein a subset size of the first region corresponds to a portion of the cycle size that is less than 360 degrees;
initiating transfer of the first region of sensor data from the memory device to a perception system upon relay of the first region of sensor data from the at least one sensor to the memory device and before the entire 360 degree scene of the particular cycle is obtained and relayed from the at least one sensor to the memory device and before initiating transfer of the second region of sensor data from the memory device to the perception system in the particular cycle; and
determining a motion plan for controlling motion of the autonomous vehicle based at least in part on the sensor data transferred to the perception system.

15. The computer-implemented method of claim 14, further comprising determining the first region within the sensor data to classify as having the first priority level and the second region within the sensor data to classify as having the second priority level, based on an expected location of an object within a second cycle of the sensor data, the expected location of the object being determined by analyzing a first cycle of the sensor data, wherein the second cycle of the sensor data is obtained subsequently to the first cycle of the sensor data.

16. The computer-implemented method of claim 14, further comprising classifying respective portions of the sensor data at the particular cycle as having a particular priority classification; and wherein initiating transfer of the sensor data at the particular cycle from the memory device to the perception system is based at least in part on the particular priority classification for the respective portions.

17. The computer-implemented method of claim 14, further comprising generating state data descriptive of at least a current state of one or more objects that are perceived within the sensor data.

18. An autonomous vehicle, comprising:
one or more processors; and
one or more non-transitory computer-readable media that store instructions that are executable by the one or more processors to cause the one or more processors to perform operations, the operations comprising:
obtaining sensor data at a plurality of consecutive cycles, the sensor data including information descriptive of an environment surrounding an autonomous vehicle;
storing the sensor data in a memory device as the sensor data becomes available from at least one sensor;
for a particular cycle of the plurality of consecutive cycles, determining a first region within the sensor data corresponding to a first priority level for at least one object of interest and a second region within the sensor data corresponding to a second priority level, wherein the first priority level is higher than the second priority level, wherein a cycle size associated with the particular cycle corresponds to a 360 degree scene of the environment, and wherein a subset size of the first region corresponds to a portion of the cycle size that is less than 360 degrees;
transferring the first region of sensor data from the memory device to a perception system associated with the one or more processors upon relay of the first region of sensor data from the at least one sensor to the memory device and before the entire 360 degree scene of the particular cycle is obtained and relayed from the at least one sensor to the memory device and before initiating transfer of the second region of sensor data from the memory device to the perception system in the particular cycle;
generating updated state data associated with at least one object of interest based at least in part on the sensor data received by the perception system; and
determining a motion plan for controlling motion of the autonomous vehicle based at least in part on the updated state data.

19. The autonomous vehicle of claim 18, wherein the at least one sensor comprises a LIDAR sensor and wherein the memory device comprises a rolling buffer.

20. The autonomous vehicle of claim 19, wherein the sensor data is written at a plurality of successive increments of the sensor data within the particular cycle to the rolling buffer, and wherein transferring the sensor data at the particular cycle from the memory device to the perception system comprises transferring the first region of the sensor data as soon as a total number of successive increments of the sensor data corresponding to the first region of the sensor data is written to the rolling buffer.

* * * * *